US011265141B2

United States Patent
Michael et al.

(10) Patent No.: US 11,265,141 B2
(45) Date of Patent: Mar. 1, 2022

(54) DATA PROCESSING DEVICE AND DATA PROCESSING METHOD

(71) Applicant: Saturn Licensing LLC, New York, NY (US)

(72) Inventors: Lachlan Bruce Michael, Saitama (JP); Kazuyuki Takahashi, Chiba (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/765,861

(22) PCT Filed: Nov. 11, 2016

(86) PCT No.: PCT/JP2016/083466
§ 371 (c)(1),
(2) Date: Apr. 4, 2018

(87) PCT Pub. No.: WO2017/090456
PCT Pub. Date: Jun. 1, 2017

(65) Prior Publication Data
US 2018/0287777 A1    Oct. 4, 2018

(30) Foreign Application Priority Data

Nov. 25, 2015    (JP) .............................. JP2015-229768

(51) Int. Cl.
*H04L 7/04* (2006.01)
*H04N 21/43* (2011.01)
(Continued)

(52) U.S. Cl.
CPC .................. *H04L 7/04* (2013.01); *G04G 7/00* (2013.01); *H04N 21/236* (2013.01);
(Continued)

(58) Field of Classification Search
CPC ...... H04L 7/04; H04N 21/43; H04N 21/2343; H04N 21/6547; H04N 21/236; H04N 21/4402; G04G 7/00
See application file for complete search history.

(56) References Cited

U.S. PATENT DOCUMENTS

2007/0076764 A1    4/2007  Kawada et al.
2016/0112731 A1    4/2016  Tsukagoshi
(Continued)

FOREIGN PATENT DOCUMENTS

CN    103634077 B    9/2017
EP    3 276 861 A1   1/2018
(Continued)

OTHER PUBLICATIONS

ATSC Candidate Standard: Physical Layer Protocol Doc. S32-230r21, Sep. 28, 2015.*
(Continued)

*Primary Examiner* — Kevin C. Harper
*Assistant Examiner* — Henry Baron
(74) *Attorney, Agent, or Firm* — Oblon, McClelland, Maier & Neustadt, L.L.P.

(57) ABSTRACT

The present technology relates to a data processing apparatus and a data processing method that can reduce errors of time arising from accuracy of time information.
The data processing apparatus generates signaling including time information having accuracy of time according to a frame length of a physical layer frame and processes the signaling so as to be included into a preamble of the physical layer frame to make it possible to reduce errors of time arising from time information. The present technology can be applied, for example, to a transmitter compatible with a broadcasting method of ATSC3.0 and so forth.

24 Claims, 23 Drawing Sheets

| CLOCK ACCURACY | ROUNDING ERROR | ACCURACY OF MPEG2-TS METHOD (±30 ppm) |
|---|---|---|
| 1kHz | 1,000±0.5 | 1,000±0.03 |
| 1MHz | 1,000,000±0.5 | 1,000,000±30 |
| 1GHz | 1,000,000,000±0.5 | 1,000,000,000±30,000 |

(51) Int. Cl.
    *G04G 7/00*     (2006.01)
    *H04N 21/6547*     (2011.01)
    *H04N 21/236*     (2011.01)
    *H04N 21/4402*     (2011.01)
    *H04N 21/2343*     (2011.01)

(52) U.S. Cl.
    CPC ..... *H04N 21/2343* (2013.01); *H04N 21/4305* (2013.01); *H04N 21/4402* (2013.01); *H04N 21/6547* (2013.01)

(56) References Cited

U.S. PATENT DOCUMENTS

| | | | |
|---|---|---|---|
| 2016/0241925 A1 | 8/2016 | Iguchi et al. | |
| 2016/0309238 A1* | 10/2016 | An | H04N 21/4622 |
| 2018/0196839 A1* | 7/2018 | Clapham | H04L 43/04 |

FOREIGN PATENT DOCUMENTS

| | | |
|---|---|---|
| JP | 2002-232847 A | 8/2002 |
| JP | 2007-104085 A | 4/2007 |
| KR | 2006-0112176 | 10/2006 |
| KR | 2010-0101998 | 9/2010 |
| KR | 2015-0016735 | 2/2015 |
| KR | 2015-0112721 | 10/2015 |
| TW | 201526650 A | 7/2015 |
| WO | WO 2014/196336 A1 | 12/2014 |
| WO | WO 2015/068352 A1 | 5/2015 |

OTHER PUBLICATIONS

Extended Search Report dated Oct. 11, 2018 in European Patent Application No. 16868404.1.

International Search Report dated Jan. 31, 2017 in PCT/JP2016/083466, 1 page.

"ATSC Candidate Standard: Physical Layer Protocol", Doc. S32-230r21, Advanced Television Systems Committee, Sep. 28, 2015, 228 pages.

ATSC Proposed Standard: Physical Layer Protocol (A/322), Doc, S32-230r56, Jun. 29, 2016, pp. 1-258.

"MMT-Based Media Transport Scheme in Digital Broadcasting Systems", ARIB STD-B60, Japan, Association of Radio Industries and Businesses (ARIB), Jul. 2014, Version 1.0, pp. 29-38, along with an English translation.

* cited by examiner

FIG. 3

| Example | 2ms Bootstrap | | | | | | | | | | | | | |
|---|---|---|---|---|---|---|---|---|---|---|---|---|---|
| 8K FFT | Gi=1024 | OFDM symbols | 10 | 11 | 12 | 13 | 14 | 15 | 16 | 17 | 18 | 19 | 20 | 21 |
| T(µs) | 0.144675926 | OFDM+GI symbol Time (ms) | 1.33 | 1.33 | 1.33 | 1.33 | 1.33 | 1.33 | 1.33 | 1.33 | 1.33 | 1.33 | 1.33 | 1.33 |
| GI Time | 0.148148148 | Total OFDM Time (ms) | 13.33 | 14.67 | 16.00 | 17.33 | 18.67 | 20.00 | 21.33 | 22.67 | 24.00 | 25.33 | 26.67 | 28.00 |
| T(ms) | 1.851851855 | Bootstrap Time (ms) | 2.00 | 2.00 | 2.00 | 2.00 | 2.00 | 2.00 | 2.00 | 2.00 | 2.00 | 2.00 | 2.00 | 2.00 |
| | | Total Frame Time (ms) | 15.33 | 16.67 | 18.00 | 19.33 | 20.67 | 22.00 | 23.33 | 24.67 | 26.00 | 27.33 | 28.67 | 30.00 |
| Frame No. | | | | | | | | | | | | | | |
| | 1 | | 15.333 | 16.667 | 18.000 | 19.333 | 20.667 | 22.000 | 23.333 | 24.667 | 26.000 | 27.333 | 28.667 | 30.000 |
| | 2 | | 30.667 | 33.333 | 36.000 | 38.667 | 41.333 | 44.000 | 46.667 | 49.333 | 52.000 | 54.667 | 57.333 | 60.000 |
| | 3 | | 46.000 | 50.000 | 54.000 | 58.000 | 62.000 | 66.000 | 70.000 | 74.000 | 78.000 | 82.000 | 86.000 | 90.000 |
| | 4 | | 61.333 | 66.667 | 72.000 | 77.333 | 82.667 | 88.000 | 93.333 | 98.667 | 104.000 | 109.333 | 114.667 | 120.000 |
| | 5 | | 76.667 | 83.333 | 90.000 | 96.667 | 103.333 | 110.000 | 116.667 | 123.333 | 130.000 | 136.667 | 143.333 | 150.000 |
| | 6 | | 92.000 | 100.000 | 108.000 | 116.000 | 124.000 | 132.000 | 140.000 | 148.000 | 156.000 | 164.000 | 172.000 | 180.000 |
| | 7 | | 107.333 | 116.667 | 126.000 | 135.333 | 144.667 | 154.000 | 163.333 | 172.667 | 182.000 | 191.333 | 200.667 | 210.000 |
| | 8 | | 122.667 | 133.333 | 144.000 | 154.667 | 165.333 | 176.000 | 186.667 | 197.333 | 208.000 | 218.667 | 229.333 | 240.000 |
| | 9 | | 138.000 | 150.000 | 162.000 | 174.000 | 186.000 | 198.000 | 210.000 | 222.000 | 234.000 | 246.000 | 258.000 | 270.000 |
| | 10 | | 153.333 | 166.667 | 180.000 | 193.333 | 206.667 | 220.000 | 233.333 | 246.667 | 260.000 | 273.333 | 286.667 | 300.000 |
| | 11 | | 168.667 | 183.333 | 198.000 | 212.667 | 227.333 | 242.000 | 256.667 | 271.333 | 286.000 | 300.667 | 315.333 | 330.000 |
| | 12 | | 184.000 | 200.000 | 216.000 | 232.000 | 248.000 | 264.000 | 280.000 | 296.000 | 312.000 | 328.000 | 344.000 | 360.000 |
| | 13 | | 199.333 | 216.667 | 234.000 | 251.333 | 268.667 | 286.000 | 303.333 | 320.667 | 338.000 | 355.333 | 372.667 | 390.000 |
| | 14 | | 214.667 | 233.333 | 252.000 | 270.667 | 289.333 | 308.000 | 326.667 | 345.333 | 364.000 | 382.667 | 401.333 | 420.000 |
| | 15 | | 230.000 | 250.000 | 270.000 | 290.000 | 310.000 | 330.000 | 350.000 | 370.000 | 390.000 | 410.000 | 430.000 | 450.000 |
| | 16 | | 245.333 | 266.667 | 288.000 | 309.333 | 330.667 | 352.000 | 373.333 | 394.667 | 416.000 | 437.333 | 458.667 | 480.000 |
| | 17 | | 260.667 | 283.333 | 306.000 | 328.667 | 351.333 | 374.000 | 396.667 | 419.333 | 442.000 | 464.667 | 487.333 | 510.000 |
| | 18 | | 276.000 | 300.000 | 324.000 | 348.000 | 372.000 | 396.000 | 420.000 | 444.000 | 468.000 | 492.000 | 516.000 | 540.000 |
| | 19 | | 291.333 | 316.667 | 342.000 | 367.333 | 392.667 | 418.000 | 443.333 | 468.667 | 494.000 | 519.333 | 544.667 | 570.000 |
| | 20 | | 306.667 | 333.333 | 360.000 | 386.667 | 413.333 | 440.000 | 466.667 | 493.333 | 520.000 | 546.667 | 573.333 | 600.000 |
| | 21 | | 322.000 | 350.000 | 378.000 | 406.000 | 434.000 | 462.000 | 490.000 | 518.000 | 546.000 | 574.000 | 602.000 | 630.000 |
| | 22 | | 337.333 | 366.667 | 396.000 | 425.333 | 454.667 | 484.000 | 513.333 | 542.667 | 572.000 | 601.333 | 630.667 | 660.000 |
| | 23 | | 352.667 | 383.333 | 414.000 | 444.667 | 475.333 | 506.000 | 536.667 | 567.333 | 598.000 | 628.667 | 659.333 | 690.000 |
| | 24 | | 368.000 | 400.000 | 432.000 | 464.000 | 496.000 | 528.000 | 560.000 | 592.000 | 624.000 | 656.000 | 688.000 | 720.000 |
| | 25 | | 383.333 | 416.667 | 450.000 | 483.333 | 516.667 | 550.000 | 583.333 | 616.667 | 650.000 | 683.333 | 716.667 | 750.000 |

L1-Basic signaling fields and syntax

| Syntax | # of bits | Format |
|---|---|---|
| L1_Basic_signaling() { | | |
|   L1B_content_tag | 2 | uimsbf |
|   L1B_version | 3 | uimsbf |
|   L1B_sbs_flag | 1 | uimsbf |
|   L1B_time_info_flag | 1 | uimsbf |
|   L1B_papr | 2 | uimsbf |
|   L1B_frame_length_mode | 1 | uimsbf |
|   L1B_frame_length | 10 | uimsbf |
|   L1B_num_subframes | 8 | uimsbf |
|   L1B_preamble_num_symbols | 3 | uimsbf |
|   L1B_preamble_reduced_carriers | 3 | uimsbf |
|   L1B_L1_Detail_size_bits | 16 | uimsbf |
|   L1B_L1_Detail_fec_type | 3 | uimsbf |
|   L1B_L1_Detail_additional_parity_mode | 2 | uimsbf |
|   L1B_L1_Detail_total_cells | 10 | uimsbf |
|   L1B_First_Sub_mimo | 1 | uimsbf |
|   L1B_First_Sub_miso | 1 | uimsbf |
|   L1B_First_Sub_fft_size | 2 | uimsbf |
|   L1B_First_Sub_reduced_carriers | 3 | uimsbf |
|   L1B_First_Sub_guard_interval | 4 | uimsbf |
|   L1B_First_Sub_excess_samples | 13 | uimsbf |
|   L1B_First_Sub_num_ofdm_symbols | 11 | uimsbf |
|   L1B_First_Sub_scattered_pilot_pattern | 5 | uimsbf |
|   L1B_First_Sub_scattered_pilot_boost | 3 | uimsbf |
|   L1B_First_Sub_sbs_first | 1 | uimsbf |
|   L1B_First_Sub_sbs_last | 1 | uimsbf |
|   L1B_Reserved | TBD | uimsbf |
|   L1B_crc | 32 | uimsbf |
| } | | |

L1B_frame_length_mode=0:time_aligned
L1B_frame_length_mode=1:symbol_aligned

FIG. 7

L1-Detail signaling fields and syntax

| Syntax | # of bits | Format |
|---|---|---|
| L1_Detail_signaling() { | | |
|   L1D_version | 4 | uimsbf |
|   L1D_num_rf | 3 | uimsbf |
|   for(L1D_rf_id=1..L1D_num_rf) { | | |
|     L1D_rf_frequency | 19 | uimsbf |
|   } | | |
|   if(L1B_time_info_flag=1) { | | |
|     L1D_time_info | TBD | |
|   } | | |

FIG. 8

L1-Detail signaling fields and syntax

| Syntax | # of bits | Format |
|---|---|---|
| L1_Detail_signaling() { | | |
| ... | | |
| if(L1B_time_info_flag=1) { | | |
| L1D_time_sec | 32 | uimsbf |
| L1D_time_msec | 10 | uimsbf |
| } | | |
| ... | | |
| } | | |

FIG.9

| CLOCK ACCURACY | ROUNDING ERROR | ACCURACY OF MPEG2-TS METHOD (±30 ppm) |
|---|---|---|
| 1kHz | 1,000±0.5 | 1,000±0.03 |
| 1MHz | 1,000,000±0.5 | 1,000,000±30 |
| 1GHz | 1,000,000,000±0.5 | 1,000,000,000±30,000 |

FIG. 10

Ext1.1-Basic signaling fields and syntax

| Syntax | # of bits | Format |
|---|---|---|
| L1_Basic_signaling() { | | |
| L1B_content_tag | 2 | uimsbf |
| L1B_version | 3 | uimsbf |
| L1B_stt_flag | 1 | uimsbf |
| L1B_time_info_flag | 1 | uimsbf |
| | | |
| L1B_papr | 2 | uimsbf |
| L1B_frame_length_mode | 1 | uimsbf |
| if(L1B_frame_length_mode == 0) { | | |
| L1B_frame_length | 10 | uimsbf |
| } else { | | |
| L1B_time_usec | 10 | uimsbf |
| } | | |
| if(L1B_frame_length_mode == 0) { | | |
| L1B_first_sub_excess_samples | 13 | uimsbf |
| } else { | | |
| L1B_time_nsec | 10 | uimsbf |
| Reserved | 3 | bslbf |
| } | | |
| ... | | |
| L1B_Reserved | 49 | uimsbf |
| L1B_crc | 32 | uimsbf |
| ... | | |

FIG. 11

Ex1:L1-Detail signaling fields and syntax

| Syntax | # of bits | Format |
|---|---|---|
| L1_Detail_signaling() { | | |
| ... | | |
| if(L1B_time_info_flag=1) { | | |
| L1D_time_sec | 32 | uimsbf |
| L1D_time_msec | 10 | uimsbf |
| } | | |
| ... | | |
| } | | |

FIG. 12

Ex2a-L1-Basic signaling fields and syntax

| Syntax | # of bits | Format |
|---|---|---|
| L1_Basic_signaling() { | | |
| L1B_content_tag | 2 | uimsbf |
| L1B_version | 3 | uimsbf |
| L1B_alt_flag | 1 | uimsbf |
| L1B_time_info_flag | 1 | uimsbf |
| if(L1B_time_info_flag==1) { | | |
| L1B_time_sec | 32 | uimsbf |
| L1B_time_msec | 10 | uimsbf |
| } | | |
| L1B_papr | 2 | uimsbf |
| L1B_frame_length_mode | 1 | uimsbf |
| if(L1B_frame_length_mode == 0) { | | |
| L1B_frame_length | 10 | uimsbf |
| } else { | | |
| L1B_time_usec | 10 | uimsbf |
| } | | |
| if(L1B_frame_length_mode == 0) { | | |
| L1B_first_sub_excess_samples | 13 | uimsbf |
| } else { | | |
| L1B_time_nsec | 10 | uimsbf |
| Reserved | 3 | bslbf |
| } | | |
| L1B_Reserved | 7 or 49 | bslbf |
| L1B_crc | 32 | uimsbf |
| } | | |

FIG. 13

Ex2a:L1-Detail signaling fields and syntax

| Syntax | # of bits | Format |
|---|---|---|
| L1_Detail_signaling() { | | |
| ... | | |
| if(L1B_time_info_flag==1) { | | |
| L1D_time_info | TBD | |
| } | | |
| ... | | |
| } | | |

FIG. 14

Ex2b:L1-Basic signaling fields and syntax

| Syntax | # of bits | Format |
|---|---|---|
| L1_Basic_signaling() { | | |
| L1B_content_tag | 2 | uimsbf |
| L1B_version | 3 | uimsbf |
| L1B_sit_flag | 1 | uimsbf |
| ~~L1B_time_info_flag~~ | ~~1~~ | ~~uimsbf~~ |
| L1B_time_sec | 32 | uimsbf |
| L1B_time_msec | 10 | uimsbf |
| L1B_papr | 2 | uimsbf |
| L1B_frame_length_mode | 1 | uimsbf |
| if(L1B_frame_length_mode == 0) { | | |
| L1B_frame_length | 10 | uimsbf |
| } else { | | |
| L1B_time_usec | 10 | uimsbf |
| } | | |
| if(L1B_frame_length_mode == 0) { | | |
| L1B_First_Sub_excess_samples | 10 | uimsbf |
| } else { | | |
| L1B_time_nsec | 10 | uimsbf |
| Reserved | 3 | bslbf |
| } | | |
| ... | | |
| L1B_Reserved | 7 | bslbf |
| L1B_crc | 32 | uimsbf |
| } | | |

FIG. 15

Ex2b:L1-Detail signaling fields and syntax

| Syntax | # of bits | Format |
|---|---|---|
| L1_Detail_signaling(){ | | |
| ... | | |
| if(L1D_time_info_flag=1){ | | |
| L1D_time_info | tbd | |
| } | | |
| ... | | |
| } | | |

FIG. 16

Ex3:L1-Basic signaling fields and syntax

| Syntax | # of bits | Format |
|---|---|---|
| L1_Basic_signaling(){ | | |
|   L1B_content_tag | 2 | uimsbf |
|   L1B_version | 3 | uimsbf |
|   L1B_sit_flag | 1 | uimsbf |
|   L1B_time_info_flag | 2 | uimsbf |
| | | |
|   L1B_papr | 2 | uimsbf |
|   L1B_frame_length_mode | 1 | uimsbf |
|   L1B_frame_length | 10 | uimsbf |
| ... | | |
|   L1B_First_Sub_excess_samples | 13 | uimsbf |
| ... | | |
|   L1B_Reserved | 48 | bslbf |
|   L1B_crc | 32 | uimsbf |
| } | | |

FIG. 17

Ex3:L1-Detail signaling fields and syntax

| Syntax | # of bits | Format |
|---|---|---|
| L1_Detail_signaling() { | | |
| ... | | |
| if(L1B_time_info_flag=01) { | | |
| L1D_time_sec | 32 | uimsbf |
| L1D_time_msec | 10 | uimsbf |
| } else if(L1B_time_info_flag=10) { | | |
| L1D_time_sec | 32 | uimsbf |
| L1D_time_msec | 10 | uimsbf |
| L1D_time_usec | 10 | uimsbf |
| } else if(L1B_time_info_flag=11) { | | |
| L1D_time_sec | 32 | uimsbf |
| L1D_time_msec | 10 | uimsbf |
| L1D_time_usec | 10 | uimsbf |
| L1D_time_nsec | 10 | uimsbf |
| } | | |
| ... | | |
| } | | |

DATA PROCESSING DEVICE AND DATA PROCESSING METHOD

TECHNICAL FIELD

The present technology relates to a data processing apparatus and a data processing method, and particularly to a data processing apparatus and a data processing method that can reduce errors of time arising from accuracy of time information.

BACKGROUND ART

As one of broadcasting methods for the next generation, formulation of ATSC (Advanced Television Systems Committee) 3.0 is being advanced (for example, refer to NPL 1). In ATSC3.0, it is supposed to provide an advanced service by introducing, as a transmission method, not an MPEG2-TS (Transport Stream) method widely spread at present but an IP (Internet Protocol) transmission method in which an IP packet that is used in the field of communication is used for digital broadcasting.

CITATION LIST

Non Patent Literature

[NPL 1]
ATSC Candidates Standard: Physical Layer Protocol (Doc. 532-230r21 28 Sep. 2015)

SUMMARY

Technical Problem

Incidentally, in data transmission by a broadcasting method such as ATSC3.0, an error in time sometimes arises from accuracy of time information included in signaling transmitted by a physical layer frame, and a proposal for reduction of errors of time arising from accuracy of time information is demanded.

The present technology has been made in view of such a situation as described above, and it is an object of the present technology to reduce errors of time arising from accuracy of time information.

Solution to Problem

The data processing apparatus according to a first aspect of the present technology is a data processing apparatus including a generation section configured to generate signaling including time information having accuracy of time according to a frame length of a physical layer frame, and a processing section configured to process the signaling so as to be included into a preamble of the physical layer frame.

The data processing apparatus according to the first aspect of the present technology may be an independent apparatus or may be an internal block that configures one apparatus. Further, the data processing method of the first aspect of the present technology is a data processing method corresponding to the data processing apparatus of the first aspect of the present technology described above.

In the data processing apparatus and the data processing method of the first aspect of the present technology, signaling including time information having accuracy of time according to a frame length of a physical layer frame is generated, and the signaling is processed so as to be included into a preamble of the physical layer frame.

The data processing apparatus according to a second aspect of the present technology is a data processing apparatus including a processing section configured to process signaling included in a preamble of a physical layer frame and including time information having accuracy of time according to a frame length of the physical layer frame.

The data processing apparatus according to the second aspect of the present technology may be an independent apparatus or may be an internal block that configures one apparatus. Further, the data processing method of the second aspect of the present technology is a data processing method corresponding to the data processing apparatus of the second aspect of the present technology described above.

In the data processing apparatus and the data processing method of the second aspect of the present technology, signaling included in a preamble of a physical layer frame and including time information having accuracy of time according to a frame length of the physical layer frame is processed.

Advantageous Effect of Invention

With the first aspect and the second aspect of the present technology, errors of time arising from accuracy of time information can be reduced.

It is to be noted that the effect described here is not necessarily restrictive and the effect may be any one of the effects described in the present disclosure.

BRIEF DESCRIPTION OF DRAWINGS

FIG. 3 is a view depicting a result of a simulation of frame time of the physical layer frame.

FIG. 4 is a view depicting a result of a simulation of frame time of the physical layer frame.

FIG. 6 is a view depicting an example of syntax of the L1 basic information.

FIG. 7 is a view depicting an example of syntax of the L1 detailed information.

FIG. 8 is a view depicting another example of syntax of the L1 detailed information.

FIG. 9 is a view depicting comparison in accuracy with an MPEG2-TS method.

FIG. 10 is a view depicting an example of syntax of the L1 basic information of an L1B+L1D transmission method.

FIG. 11 is a view depicting an example of syntax of the L1 detailed information of an L1B+L1D transmission method.

FIG. 12 is a view depicting an example of syntax of the L1 basic information of an L1B transmission method a.

FIG. 13 is a view depicting an example of syntax of the L1 detailed information of the L1B transmission method a.

FIG. 14 is a view depicting an example of syntax of the L1 basic information of an L1B transmission method b.

FIG. 15 is a view depicting an example of syntax of the L1 detailed information of the L1B transmission method b.

FIG. 16 is a view depicting an example of syntax of the L1 basic information of an L1D transmission method.

FIG. 17 is a view depicting an example of syntax of the L1 detailed information of the L1D transmission method.

DESCRIPTION OF EMBODIMENT

In the following, an embodiment of the present technology is described with reference to the drawings. It is to be noted that description is given in the following order.
1. Configuration of System
2. Overview of Frame Mode
3. Transmission Method of Time Information
(1) L1B+L1D transmission method
(2a) L1B transmission method a
(2b) L1B transmission method b
(3) L1D transmission method
4. Detailed Configuration of Transmission Side and Reception Side
5. Modifications
6. Configuration of Computer <1. Configuration of System>

(Configuration Example of Transmission System)

Figure 1:
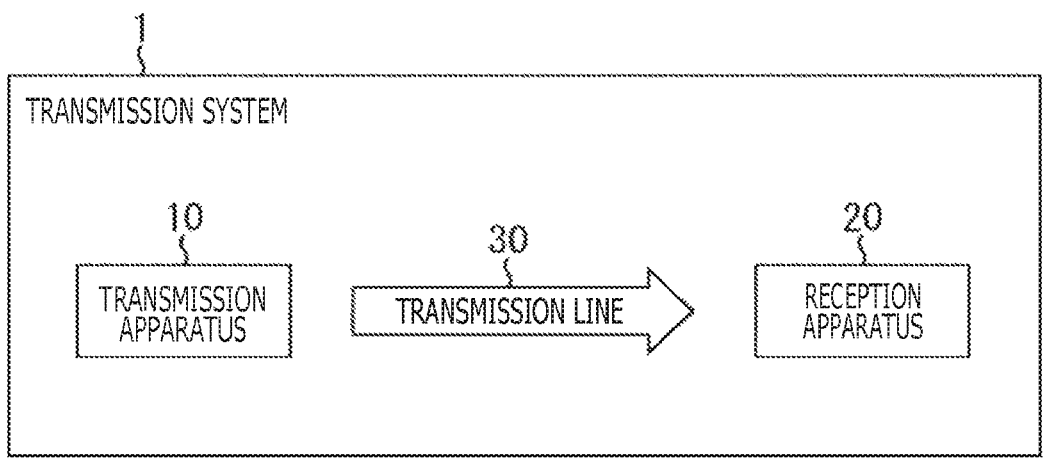
FIG. 1 is a view depicting an example of a configuration of a transmission system to which the present technology is applied.

FIG. 1 is a view depicting a configuration of an embodiment of a transmission system to which the present technology is applied. It is to be noted that the term system is a logical set of a plurality of apparatus.

Referring to FIG. 1, the transmission system 1 includes a transmission apparatus 10 and a reception apparatus 20. In this transmission system 1, data transmission in compliance with a broadcasting method of ATSC3.0 (standard for digital broadcasting) or the like is performed.

The transmission apparatus 10 is a transmitter compatible with a broadcasting method of ATSC3.0 or the like and transmits content through a transmission line 30. For example, the transmission apparatus 10 transmits a broadcasting stream, which includes (components of) videos, audios and so forth configuring a content of a broadcasting program or the like and signaling, as a broadcasting wave through the transmission line 30.

The reception apparatus 20 is a receiver compatible with a broadcasting method of ATSC3.0 or the like and receives and outputs content transmitted from the transmission apparatus 10 through the transmission line 30. For example, the reception apparatus 20 receives a broadcasting wave from the transmission apparatus 10 and processes (components of) videos, audios and so forth configuring content and signaling, which are included in a broadcasting stream, to reproduce the videos and audios of the content of a broadcasting program or the like.

It is to be noted that, in the transmission system 1, the transmission line 30 may be a terrestrial wave (terrestrial broadcasting) or may be satellite broadcasting that utilizes, for example, a broadcasting satellite (BS: Broadcasting Satellite) or a communication satellite (CS: Communications Satellite) or cable broadcasting (CATV) that uses a cable.

<2. Overview of Frame Mode>

(Physical Layer Frame)

Figure 2:
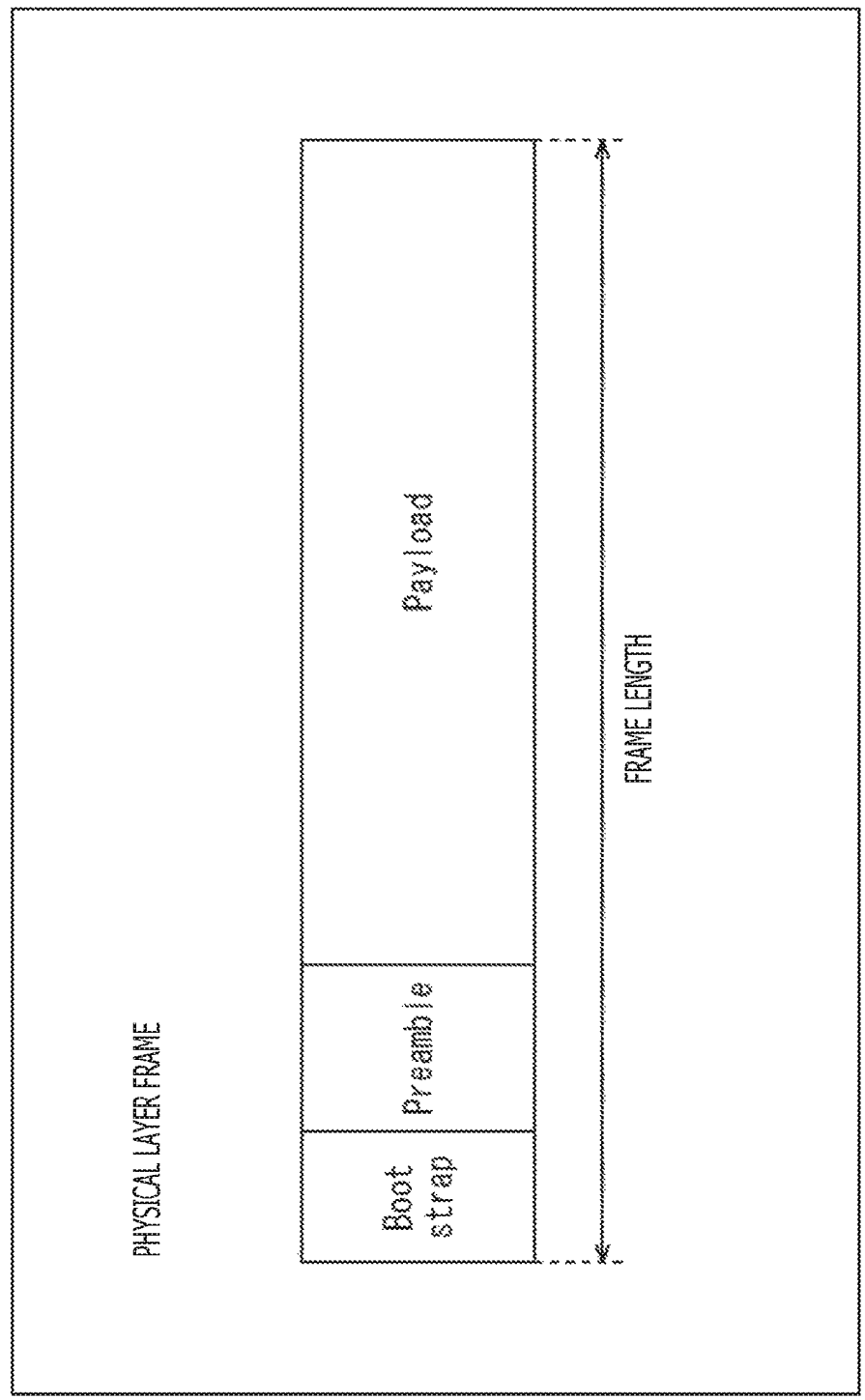
FIG. 2 is a view depicting a structure of a physical layer frame.

FIG. 2 is a view depicting a structure of a physical layer frame used in data transmission in compliance with a broadcasting method of ATSC3.0 and so forth.

Referring to FIG. 2, the physical layer frame includes a bootstrap (Bootstrap), a preamble (Preamble) and a payload (Payload). The physical layer frame is configured with a predetermined frame length such as a unit of millisecond. According to the physical layer frame, after the bootstrap and the preamble are acquired, the succeeding payload can be acquired.

It is to be noted that the bootstrap corresponds, for example, to the P1 symbol that configures a T2 frame of DVB-T2 (Digital Video Broadcasting-Second Generation Terrestrial), and the preamble corresponds, for example, to the P2 symbol that configures a T2 frame of DVB-T2. Accordingly, also it can be considered that the bootstrap is the preamble.

Incidentally, in ATSC3.0, a time-aligned mode (time-aligned mode) and a symbol-aligned mode (symbol-aligned mode) are prescribed as frame modes according to the frame length of the physical layer frame.

The time-aligned mode is a mode in which a surplus sample is inserted into a guard interval (GI: Guard Interval) part to adjust the frame length (frame time) of the physical layer frame to units of integer milliseconds, whereafter the physical layer frame is transmitted.

For example, in the case where broadcasting (for example, data transmission in compliance with ATSC3.0) and communication (for example, data transmission in compliance with LTE (Long Term Evolution)) are to be caused to coexist in the same RF channel, if the frame length (frame time) of the physical layer frame is units of integer milliseconds, then this is convenient because delimiters of time coincide. However, in the time-aligned mode, since a surplus sample (meaningless data) is transmitted, data transmission is less efficient.

In the symbol-aligned mode is a mode in which data is transmitted as it is without a surplus sample inserted therein. Since, in the symbol-aligned mode, a surplus sample is not transmitted, efficient data transmission can be performed. For example, in DVB-T (Digital Video Broadcasting-Terrestrial), DVB-T2 and ISDB-T (Integrated Services Digital Broadcasting-Terrestrial), data transfer similar to that in the symbol-aligned mode is performed.

However, in the symbol-aligned mode, since a sample for causing delimiters of time to coincide with each other is not inserted, in physical layer frames, not only physical layer frames whose frame length (frame time) is units of integer milliseconds (physical layer frames that exist along boundaries of milliseconds) but also physical layer frames whose frame length (frame time) is not units of integer milliseconds (physical layer frames that do not exist along boundaries of milliseconds) exist.

Here, a result of a simulation of frame time of a physical layer frame in the case where the symbol-aligned mode is set is described with reference to FIGS. 3 and 4.

FIG. 3 indicates a result of a simulation of frame time of a physical layer frame when, in the case where the FFT mode is an 8K mode and the guard interval (GI) is 1,024, the number of OFDM symbols included in one physical layer frame is changed. It is to be noted that, in FIG. 3, it is represented by shade whether the frame time is units of integer milliseconds.

Referring to FIG. 3, if attention is paid to a case in which, for example, the OFDM symbol number is 10, namely, the number of OFDM symbols included in one physical layer frame is 10, then since the symbol time of the OFDM and the GI is 1.33 milliseconds, the total OFDM time is 13.33 milliseconds (=1.33 milliseconds×10). Further, in this example, since the time of the bootstrap is 2.00 milliseconds, the frame length is 15.33 milliseconds (=13.33 milliseconds+2.00 milliseconds).

In this case in which the OFDM symbol number is 10, the frame time of the first physical layer frame is 15.333 milliseconds, and the frame time of the second physical layer frame is 30.667 milliseconds. Further, the frame time of the third physical layer frame is 46.000 milliseconds (30.667 milliseconds+15.33 milliseconds), and the frame time of the fourth physical layer frame is 61.333 milliseconds (46.000 milliseconds+15.33 milliseconds).

Similarly, also in the fifth and succeeding physical layer frames, time when 15.33 milliseconds is added to the frame time of a physical layer frame immediately preceding in time can be determined as frame time of the physical layer frame of the target. In particular, as the frame time of the fifth to 25th physical layer frames, 76.667 milliseconds, 92.000 milliseconds, 107.333 milliseconds, 122.667 milliseconds, 138.000 milliseconds, 153.333 milliseconds, 168.667 milliseconds, 184.000 milliseconds, 199.333 milliseconds, 214.667 milliseconds, 230.000 milliseconds, 245.333 milliseconds, 260.667 milliseconds, 276.000 milliseconds, 291.333 milliseconds, 306.667 milliseconds, 322.000 milliseconds, 337.333 milliseconds, 352.667 milliseconds, 368.000 milliseconds and 383.333 milliseconds are determined.

In this manner, in the case where the OFDM symbol number is 10, although the frame time of the physical layer frame is units of integer milliseconds at fixed intervals like 46.000 milliseconds, 92.000 milliseconds, 138.000 milliseconds, 184.000 milliseconds, 230.000 milliseconds, 276.000 milliseconds, 322.000 milliseconds and 368.000 milliseconds, also frame time that is not units of integer milliseconds exists.

On the other hand, if attention is paid to a case in which, in FIG. 3, for example, the OFDM symbol number is 12, namely, the number of OFDM symbols included in one physical layer frame is 12, then since the symbol time of the OFDM and the GI is 1.33 milliseconds, the total OFDM time is 16.00 milliseconds. Further, since the time of the bootstrap is 2.00 milliseconds, the frame length is 18.00 milliseconds (=16.00 milliseconds+2.00 milliseconds).

In the case where the OFDM symbol number is 12, the frame time of the first physical layer frame is 18.000 milliseconds, and the frame time of the second physical layer frame is 36.000 milliseconds (18.00 milliseconds+18.00 milliseconds). Further, the frame time of the third physical layer frame is 54.000 milliseconds (36.000 milliseconds+18.00 milliseconds), and the frame time of the fourth physical layer frame is 72.000 milliseconds (54.000 milliseconds+18.00 milliseconds).

Similarly, also in the fifth and succeeding physical layer frames, time when 18.00 milliseconds is added to the frame time of a physical layer frame immediately preceding in time can be determined as frame time of the physical layer frame of the target. In particular, as the frame time of the fifth to 25th physical layer frames, 90.000 milliseconds, 108.000 milliseconds, 126.000 milliseconds, 144.000 milliseconds, 162.000 milliseconds, 180.000 milliseconds, 198.000 milliseconds, 216.000 milliseconds, 234.000 milliseconds, 252.000 milliseconds, 270.000 milliseconds, 288.000 milliseconds, 306.000 milliseconds, 324.000 milliseconds, 342.000 milliseconds, 360.000 milliseconds, 378.000 milliseconds, 396.000 milliseconds, 414.000 milliseconds, 432.000 milliseconds and 450.000 milliseconds are determined.

In this manner, in the case where the OFDM symbol number is 12, the frame time of all physical layer frames is units of integer milliseconds like 18.000 milliseconds, 36.000 milliseconds, ..., 432.000 milliseconds and 450.000 milliseconds.

In particular, in the simulation result of FIG. 3, in the case where the OFDM symbol number is 10, 11, 13, 14, 16, 17, 19 and 20, although the frame time of a physical layer frame becomes units of integer milliseconds at every other two, any other frame time does not become units of integer milliseconds. On the other hand, in the case where the OFDM symbol number is 12, 15, 18 and 21, the frame time of all physical layer frames is units of integer milliseconds.

Figure 4:
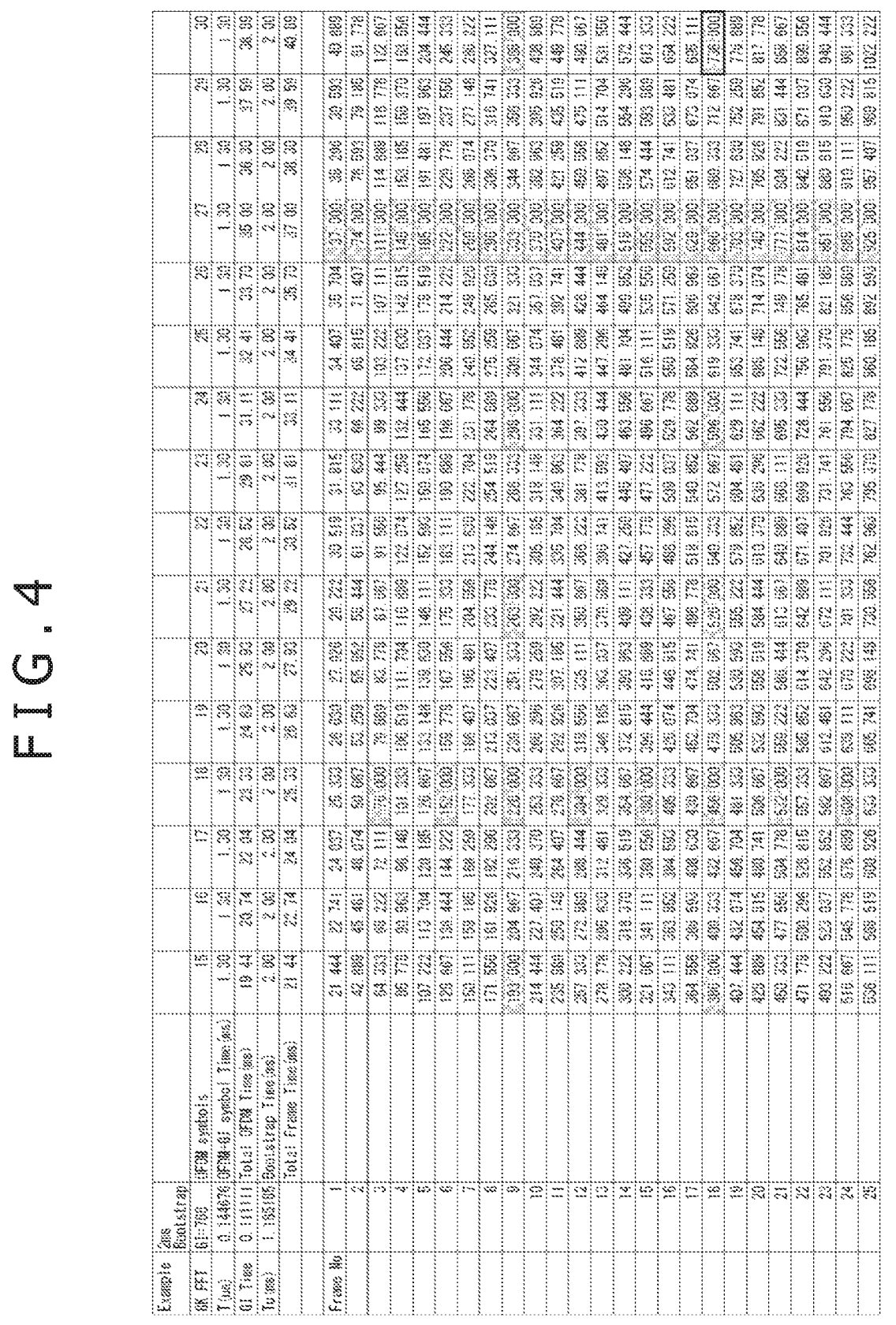

Meanwhile, FIG. 4 depicts a simulation result of the frame time of the physical layer frame when the number of OFDM symbols included in one physical layer frame is changed in the case where the FFT mode is the 8K mode and besides the guard interval (GI) is 768. It is to be noted that, also in FIG. 4, it is represented by shade whether the frame time is units of integer milliseconds.

In the simulation result of FIG. 4, in the case where the OFDM symbol number is 15, 21, 24 and 30, although the frame time of the physical layer frame becomes units of integer milliseconds at every eight, the frame time of any other frame does not become units of integer milliseconds. Further, in the case where the OFDM symbol number is 16, 17, 19, 20, 22, 23, 25, 26, 28 and 29, the frame time of all physical layer frames does no become units of integer milliseconds. On the other hand, in the case where the OFDM symbol number is 27, the frame time of all physical layer frames is units of integer milliseconds.

As described above, since, in the symbol-aligned mode, a sample for making delimiters of time coincide with each other is not inserted, whether or not the frame time of a physical layer frame becomes units of integer milliseconds is determined depending upon a combination of the FFT mode or the OFDM symbol number, the guard interval (GI), the symbol time and so forth. For example, while, in the simulation result of FIG. 3, the frame time is units of integer milliseconds at a certain ratio, in the simulation result of FIG. 4, the ratio at which the frame time is units of integer milliseconds is low.

Therefore, in current ATSC3.0, upon data transmission in the time-aligned mode, since the frame length is an integer multiple of a millisecond, it is supposed that time information transmission by signaling is transmitted in accuracy of milliseconds. Meanwhile, even in the case where the symbol-aligned mode is set, although no problem occurs in a physical layer frame whose frame time is units of integer milliseconds because no error occurs from time indicated by time information, in a physical layer frame whose frame time is not units of integer milliseconds, an error (jitters) from time indicated by time information occurs.

Therefore, in the present circumstances, in the case where the symbol-aligned mode is set, since a physical layer frame with which no error occurs and a physical layer frame with which an error occurs exist, only a physical layer frame with which an error does not occur can include time information in the signaling. That time information is transmitted only by a specific physical layer frame with which an error does not occur in this manner is not preferable to a broadcaster because it narrows the degree of freedom in operation or mounting. On the other hand, in the case where time information is transmitted by a physical layer frame other than a specific physical layer frame with which an error does not occur, an error (rounding error) occurs, which is not desirable to perform processing.

According to the present technology, in order to solve such a problem as described above, the accuracy of time information to be transmitted by the signaling is made higher than the accuracy of milliseconds in the present circumstances such that, even in the case where the symbol-aligned mode is set as the frame mode, an error does not occur (an error can be reduced) between the time indicated by the time information and the frame time in all physical layer frames.

It is to be noted that the time information transmitted by the signaling represents absolute time of a predetermined position in a stream of a physical layer frame. The time of a predetermined position in a stream is time of a predetermined timing while a bit at a predetermined position is being processed by the transmission apparatus 10. Here, the predetermined position in a stream of a physical layer frame in which the time information represents time is referred to as time position.

As the time position, for example, the top position of a physical layer frame that has a preamble in which time information is included (position of the top of the bootstrap) can be adopted. Further, as the time position, for example, a position of the boundary between the bootstrap and the preamble of a physical layer frame that has the preamble in which time information is included (the last position of the bootstrap or the top position of the preamble) can be adopted.

Further, as the time position, for example, the last position of the preamble of a physical layer frame that has the preamble in which time information is included can be adopted. It is to be noted that, as the time position, an arbitrary position of a physical layer frame can be adopted further.

<3. Transmission Method of Time Information>
(Overview of L1 Basic Information and L1_Detailed Information)

Figure 5:
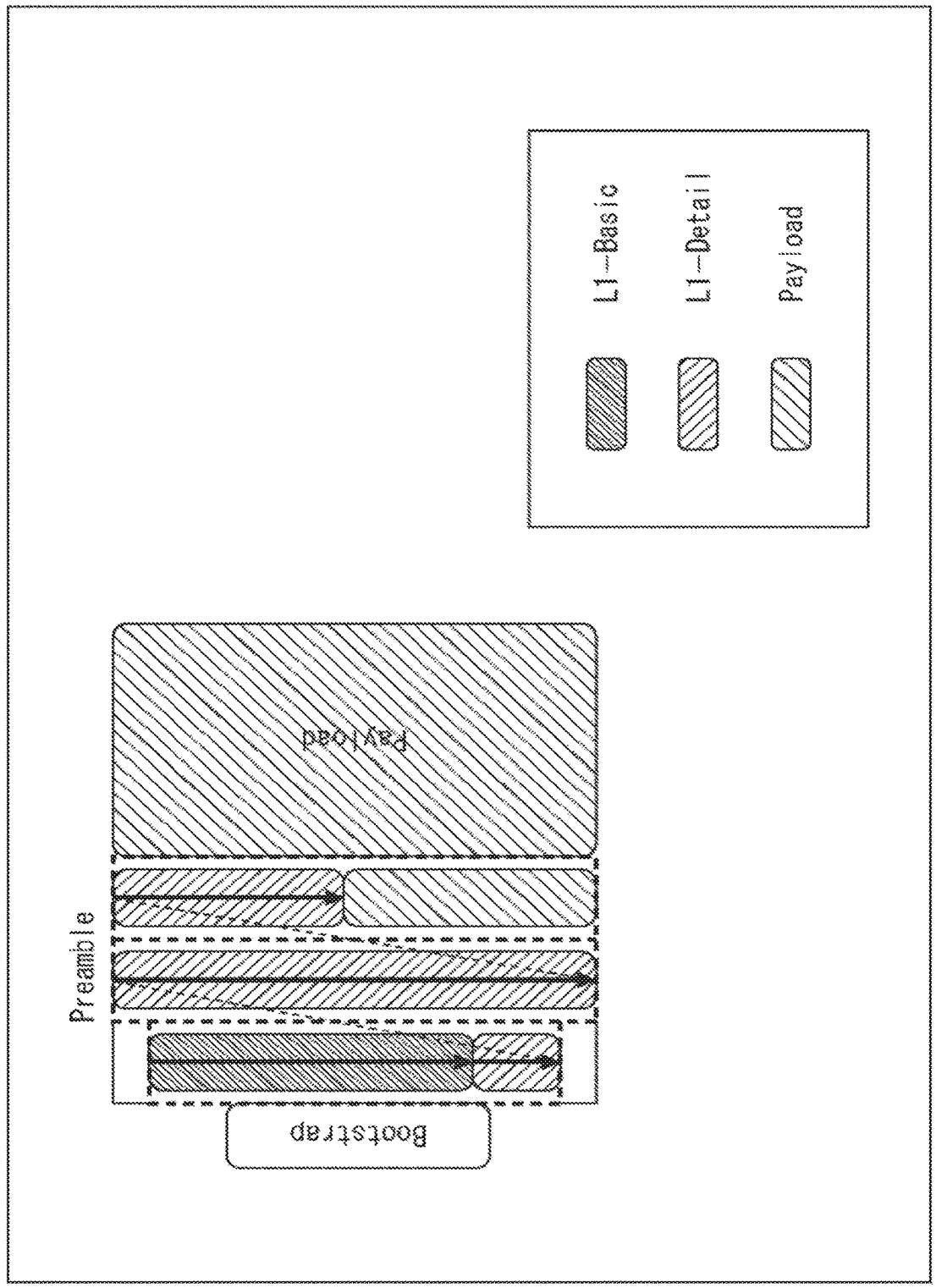
FIG. 5 is a view illustrating L1 basic information and L1 detailed information

FIG. 5 is a view illustrating an overview of L1 basic information and L1 detailed information.

Referring to FIG. 5, as the signaling included in the preamble (Preamble) of a physical layer frame, L1 basic information (L1-Basic) and L1 detailed information (L1-Detail) are available.

Here, if the L1 basic information and the L1 detailed information are compared with each other, then while the L1 basic information is configured from a number of bits approximately equal to 200 bits, the L1 detailed information is different in size in that it includes 400 to several thousands of bits. Further, as indicated by arrow marks in FIG. 5, in the preamble, the L1 basic information and the L1 detailed information are read out in this order, and therefore, the L1 basic information is read out earlier than the L1 detailed information. Furthermore, the L1 basic information is different when compared with the L1 detailed information also in that it is transmitted more robustly.

(L1 Basic Information)

FIG. 6 is a view depicting an example of the syntax of the L1 basic information (L1-Basic) of FIG. 5. It is to be noted that detailed contents of the L1 basic information are described in "Table 9.2 L1-Basic signaling fields and syntax" of NPL 1 specified hereinabove.

L1b_content_tag of 2 bits represents a tag value for identifying the content. L1B_version of 3 bits represents the version of the L1 basic information. L1B_sit_flag of 1 bit represents whether or not there exists an SLT (Service Labeling Table).

L1B_time_info_flag of 1 bit represents whether or not there exists time information. L1B_papr of 2 bits represents application of PAPR (Peak to Average Power Reduction).

L1B_frame_length_mode of 1 bit represents a frame mode. In the case where L1B_frame_length_mode=0, the frame mode is a time-aligned mode. On the other hand, in the case where L1B_frame_length_mode=1, the frame mode is a symbol-aligned mode.

L1B_frame_length of 10 bits represents a frame length of the physical layer frame. However, this L1B_frame_length is used only in the case where the frame mode is the time-aligned mode, but is not used in the case where the frame mode is the symbol-aligned mode.

L1B_num_subframes of 8 bits represents a number of sub frames included in the physical layer frame. L1B_preamble_num_symbols of 3 bits represents a number of OFDM symbols included in the preamble. L1B_preamble_reduced_carriers of 3 bits represents a number of control units according to reduction of the maximum number of carriers of the FFT size used in the preamble.

L1B_L1_Detail_size_bits of 16 bits represents a size of the L1 detailed information (L1-Detail). L1B_L1_Detail_fec_type of 3 bits represents an FEC type of the L1 detailed information. L1B_L1_Detail_additional_parity_mode of 2 bits represents an additional parity mode of the L1 detailed information. L1B_L1_Detail_total_cells of 19 bits represents a total size of the L1 detailed information.

L1B_First_Sub_mimo of 1 bit represents a use situation of MIMO (Multiple Input and Multiple Output) of the top sub frame. L1B_First_Sub_miso of 1 bit represents a use situation of MISO (Multiple Input and Single Output) of the top sub frame.

L1B_First_Sub_fft_size of 2 bits represents an FFT size of the top sub frame. L1B_First_Sub_reduced_carriers of 3 bits represents a number of control units according to reduction of the maximum number of carriers of the FFT size used in the top sub frame. L1B_First_Sub_guard_interval of 4 bits presents a guard interval length of the top sub frame.

L1B_First_Sub_excess_samples of 13 bits represents a number of surplus samples inserted in the guard interval part in the top sub frame. However, this L1B_First_Sub_excess_samples is used only in the case where the frame mode is the time-aligned mode, but is not used in the case where the frame mode is the symbol-aligned mode.

L1B_First_Sub_num_ofdm_samples of 11 bits represents a number of OFDM symbols included in the top sub frame. L1B_First_Sub_scattered_pilot_pattern of 5 bits presents an SP pattern (Scattered Pilot Pattern) used in the top sub frame. L1B_First_Sub_scattered_pilot_boost of 3 bits represents a value by which the magnitude of the SP pattern is increased.

L1B_First_Sub_sbs_first of 1 bit represents the top of an SBS (Subframe Boundary Symbol) of the top sub frame. L1B_First_Sub_sbs_last of 1 bit represents the tail end of the SBS of the top sub frame.

L1B_Reserved is a reserved region (Reserved). Although the bit number of L1B_Reserved is not determined (TSD: To Be determined), in the present circumstances, it is 49 bits. L1B_crc of 32 bits represents that a CRC (Cyclic Redundancy Check) value is included.

It is to be noted that, in the case where uimsbf (unsigned integer most significant bit first) is designated as the format (Format), this signifies that bit arithmetic operation is performed and a result is treated as an integer. On the other hand, in the case where bslbf (bit string, left bit first) is designated, then a result is treated as a bit string.

(L1_Detailed Information)

FIG. 7 is a view depicting an example of the syntax of the L1 detailed information (L1-Detail) of FIG. 5. However, in the syntax of FIG. 7, a portion that specifically relates to the present technology from within the L1 detailed information is described with excerpts. It is to be noted that detailed contents of the L1 detailed information are described in "Table 9.12 L1-Detail signaling fields and syntax" of NPL 1 specified hereinabove.

L1D_version of 4 bits represents a version of the L1 detailed information.

In a loop according to L1D_num_rf of 3 bits, a parameter relating to channel bonding (Channel Bonding) is placed. In particular, L1D_rf_frequency of 19 bits represents a frequency of an RF channel coupled by the channel bonding.

Here, in the case where L1B_time_info_flag=1 in the L1 basic information of FIG. 7, since this indicates that time information exists, L1D_time_info as time information is placed in the L1 detailed information. It is to be noted that the bit number of L1D_time_info is undetermined (TBD).

However, since it is supposed in ATSC3.0 in the present circumstances that time information to be transmitted by signaling is transmitted with accuracy of milliseconds as described hereinabove, it is supposed that, as L1D_time_info, L1D_time_sec of 32 bits and L1D_time_msec of 10 bits are placed as depicted in FIG. 8. It is to be noted that L1D_time_sec represents time information in a unit of second. Meanwhile, L1D_time_msec represents time information in a unit of millisecond.

In contrast, in the present technology, as time information of higher accuracy than the accuracy of a unit of millisecond in the present circumstances, time information in a unit of microsecond (usec) and a unit of nanosecond (nsec) is transmitted in addition to time information in a unit of second (sec) and a unit of millisecond (msec).

It is to be noted that, although a field compatible with the accuracy of seconds or less can transmit not only time information in a unit of millisecond, for example, of 10 bits but time information in a unit of microsecond of 10 bits or time information in a unit of microsecond and a unit of nanosecond of 20 bits, since to transmit, in the case where a service by broadcasting is performed in the transmission system 1 of FIG. 1, time information of higher accuracy than necessary by the broadcasting has such an influence as to compress the transmission band, this is not effective.

Therefore, for example, if it is supposed to utilize the PTP (Precision Time Protocol) prescribed in IEEE 1588-2008 as the time information, then since it is possible for the PTP to include a second field and a nanosecond field and be ready for the accuracy of a unit of nanosecond, it is assumed that time information of accuracy higher than the accuracy of nanosecond, namely, such time information as exceeds 30 bits, is not transmitted in addition to time information in a unit of second and a unit of microsecond. However, time information in a unit of microsecond of 10 bits, time information in a unit of microsecond and a unit of nanosecond of 20 bits or the like is an example, and some other bit accuracy may be adopted.

Further, although, in the conventional MPEG2-TS method, accuracy of a clock is prescribed by a standard (for example, 27 MHz, 30 ppm), if the error (rounding error) between time indicated by time information of signaling and frame time in the case where the frame mode is the symbol-aligned mode is compared with the accuracy of the MPEG2-TS method, then a result is such as depicted in FIG. 9. In particular, from the table of FIG. 9, it is apparent that, although the accuracy of the time information in a unit of millisecond degrades from the accuracy of the MPEG2-TS method, the accuracy of the time information in a unit of microsecond and a unit of nanosecond is improved significantly from the accuracy of the MPEG2-TS method.

Accordingly, also depending upon the comparison on accuracy with the MPEG2-TS method, it is demonstrated that it is effective to transmit time information in a unit of microsecond of 10 bits or time information in a unit of microsecond and a unit of nanosecond of 20 bits by signaling. However, as regards the error (rounding error) of FIG. 9, no error occurs in the case where the frame mode is the time-aligned mode as described hereinabove, and besides, also in the case where the frame mode is the symbol-aligned mode, no error occurs in physical layer frames in which the frame time is a unit of integer millisecond.

Further, in the present technology, the time information described above is placed into the L1 basic information and the L1 detailed information as signaling. Further, only it is necessary for the time information to be included in at least one of the L1 basic information and the L1 detailed information. In the following, four transmission methods including an L1B+L1D transmission method that transmits time information with both the L1 basic information and the L1 detailed information, an L1B transmission method 1 and an L1B transmission method b that transmit time information only with the L1 basic information, and an L1D transmission method that transmits time information only with the L1 detailed information.

(1) L1B+L1D Transmission Method

First, the L1B+L1D transmission method is described with reference to the syntaxes of FIGS. 10 and 11.

(Syntax of L1 Basic Information)

FIG. 10 is a view depicting an example of the syntax of the L1 basic information of the L1B+L1D transmission method. However, in the syntax of FIG. 10, only characteristic portions are described with excerpts.

In the L1 basic information of FIG. 10, in the case where the frame mode is the time-aligned mode (L1B_frame_length_mode=0), L1B_frame_length of 10 bits is placed, but in the case where the frame mode is the symbol-aligned mode (L1B_frame_length_mode=1), L1B_time_usec of 10 bits is placed.

Further, in the L1 basic information of FIG. 10, in the case where the frame mode is the time-aligned mode (L1B_frame_length_mode=0), L1B_First_Sub_excess_samples of 13 bits is placed, but in the case where the frame mode is the symbol-aligned mode (L1B_frame_length_mode=1), L1B_time_nsec of 10 bits is placed. However, in the case where L1B_time_nsec of 10 bits is placed, the succeeding 3 bits are used as a reserved region (Reserved).

In this manner, in the L1 basic information of the L1B+L1D transmission method, in the case where the frame mode is the symbol-aligned mode, time information in a unit of microsecond (L1B_time_usec) and time information in a unit of nanosecond (L1B_time_nsec) are included.

(Syntax of L1_Detailed Information)

FIG. 11 is a view depicting an example of the syntax of the L1 detailed information of the L1B+L1D transmission method. However, in the syntax of FIG. 11, only characteristic portions are described with excerpts.

In the L1 detailed information of FIG. 11, in the case where time information exists (L1B_time_info_flag=1), L1D_time_sec of 32 bits and L1D_time_msec of 10 bits are placed.

In this manner, in the L1 detailed information of the L1B+L1D transmission method, in the case where time information exists, time information in a unit of second (L1D_time_sec) and time information in a unit of millisecond (L1D_time_msec) are included.

In this manner, in the case where the L1B+L1D transmission method is adopted, time information in a unit of second (L1D_time_sec), time information in a unit of millisecond (L1D_time_msec), time information in a unit of microsecond (L1B_time_usec) and time information in a unit of nanosecond (L1B_time_nsec) are transmitted by the L1 basic information and the L1 detailed information. Further, since time obtained from the time information has accuracy of a unit of nanosecond, in the case where the frame mode is the symbol-aligned mode, the error (jitters) from the time indicated by the time information can be suppressed even with the physical layer frame in which the frame length (frame time) is not units of integer milliseconds.

Further, since the L1B+L1D transmission method can be implemented only by utilizing the structure of the L1 detailed information in the present circumstances as it is and applying some modification to the structure of the L1 basic information in the current circumstances (L1B_frame_length and L1B_First_Sub_excess_samples that are not used in the symbol-aligned mode are utilized), the cost for modification can be reduced. Further, since the L1B+L1D transmission method uses many structures of the L1 basic information and the L1 detailed information in the present circumstances, it is efficient as well.

It is to be noted that, while the L1 basic information of FIG. 10 indicates an example in which time information in a unit of microsecond (L1B_time_usec) and time information in a unit of nanosecond (L1B_time_nsec) are included in the case of the symbol-aligned mode, only time information in a unit of microsecond (L1B_time_usec) may otherwise be included. Also in this case, time information of accuracy higher than that of a unit of millisecond is transmitted.

(2a) L1B Transmission Method a

Now, the L1B transmission method a is described with reference to the syntaxes of FIGS. 12 and 13

(Syntax of L1 Basic Information)

FIG. 12 is a view depicting an example of the syntax of the L1 basic information of the L1B transmission method a. It is to be noted that, in the syntax of FIG. 12, only characteristic portions are described with excerpts.

In the L1 basic information of FIG. 12, in the case where time information exists (L1B_time_info_flag=1), L1B_time_sec of 32 bits and L1B_time_msec of 10 bits are placed.

Further, in the L1 basic information of FIG. 12, in the case where the frame mode is the time-aligned mode (L1B_frame_length_mode=0), L1B_frame_length of 10 bits is placed, but in the case where the frame mode is the symbol-aligned mode (L1B_frame_length_mode=1), L1B_time_usec of 10 bits is placed.

Furthermore, in the L1 basic information of FIG. 12, in the case where the frame mode is the time-aligned mode (L1B_frame_length_mode=0), L1B_First_Sub_excess_samples of 13 bits is placed, but in the case where the frame mode is the symbol-aligned mode (L1B_frame_length_mode=1), L1B_time_nsec of 10 bits and Reserved of 3 bits are placed.

It is to be noted that, while L1B_Reserved has 7 bits or 49 bits, this signifies that, in the case where time information exists, a reserved region (Reserved) of 7 bits is secured, but in the case where time information does not exist, a reserved region (Reserved) of 49 bits is secured.

In this manner, in the L1 basic information of the L1B transmission method a, in the case where time information exists and besides the frame mode is the symbol-aligned mode, time information in a unit of second (L1B_time_sec), time information in a unit of millisecond (L1B_time_msec), time information in a unit of microsecond (L1B_time_usec) and time information in a unit of nanosecond (L1B_time_nsec) are included.

(Syntax of L1_Detailed Information)

FIG. 13 is a view depicting an example of the syntax of the L1 detailed information of the L1B transmission method a. However, in the syntax of FIG. 13, only characteristic portions are described with excerpts.

In the L1 detailed information of FIG. 13, since time information is placed on the L1 basic information side, time information (L1D_time_info) is not placed.

As described above, in the case where the L1B transmission method a is adopted, time information in a unit of second (L1B_time_sec), time information in a unit of millisecond (L1B_time_msec), time information in a unit of microsecond (L1B_time_usec) and time information in a unit of nanosecond (L1B_time_nsec) are transmitted only by the L1 basic information. Further, since the time obtained from the time information has accuracy of a unit of nanosecond, in the case where the frame mode is the symbol-aligned mode, the error (jitters) from the time indicated by the time information can be suppressed even with the physical layer frame in which the frame length (frame time) is not units of integer milliseconds.

Further, in the L1B transmission method a, since time information is transmitted only by the L1 basic information that is robust, all time information can be protected sufficiently. Further, in the L1B transmission method a, since all time information is transmitted by the L1 basic information, it is possible to transmit all time information collectively together with the L1 basic information side. Consequently, for example, the reception apparatus 20 can decode the time information included in the L1 basic information more rapidly.

It is to be noted that, while the L1 basic information of FIG. 12 depicts an example in which time information in a unit of microsecond (L1B_time_usec) and time information in a unit of nanosecond (L1B_time_nsec) are included in the case of the symbol-aligned mode, only time information in a unit of microsecond (L1B_time_usec) may otherwise be included. Also in this case, time information of accuracy higher than a unit of millisecond is transmitted.

(2b) L1B Transmission Method b

Now, the L1B transmission method b is described with reference to the syntaxes of FIGS. 14 and 15.

(Syntax of L1 Basic Information)

FIG. 14 is a view depicting an example of the syntax of the L1 basic information of the L1B transmission method b. However, in the syntax of FIG. 14, only characteristic portions are described with excerpts.

In the L1 basic information of FIG. 14, L1B_time_info_flag of 1 bit is deleted while L1B_time_sec of 32 bits and L1B_time_msec of 10 bits are always placed.

Further, in the L1 basic information of FIG. 14, in the case where the frame mode is the time-aligned mode (L1B_frame_length_mode=0), L1B_frame_length of 10 bits is placed, but in the case where the frame mode is the symbol-aligned mode (L1B_frame_length_mode=1), L1B_time_usec of 10 bits is placed.

Furthermore, in the L1 basic information of FIG. 14, in the case where the frame mode is the time-aligned mode (L1B_frame_length_mode=0), L1B_First_Sub_excess_samples of 13 bits is placed, but in the case where the frame mode is the symbol-aligned mode (L1B_frame_length_mode=1), L1B_time_nsec of 10 bits and Reserved of 3 bits are placed.

In this manner, in the L1 basic information of the L1B transmission method b, in the case where the frame mode is the time-aligned mode, time information in a unit of second (L1B_time_sec) and time information in a unit of millisecond (L1B_time_msec) are included, and in the case where the frame mode is the symbol-aligned mode, time information in a unit of microsecond (L1B_time_usec) and time information in a unit of nanosecond (L1B_time_nsec) are included in addition to time information in a unit of microsecond (L1B_time_usec).

(Syntax of L1_Detailed Information)

FIG. 15 is a view depicting an example of the syntax of the L1 detailed information of the L1B transmission method b. However, in the syntax of FIG. 15, only characteristic portions are described with excerpts.

In the L1 detailed information of FIG. 15, since time information is placed on the L1 basic information side, time information (L1D_time_info) is not placed there at all.

As described above, in the case where the L1B transmission method b is adopted, time information in a unit of second (L1B_time_sec), time information in a unit of millisecond (L1B_time_msec), time information in a unit of microsecond (L1B_time_usec) and time information in a unit of nanosecond (L1B_time_nsec) are transmitted only by the L1 basic information. Further, since the time obtained from the time information has accuracy of a unit of nanosecond, in the case where the frame mode is the symbol-aligned mode, the error (jitters) from the time indicated by the time information can be suppressed even with a physical layer frame in which the frame length (frame time) is not units of integer milliseconds.

Further, in the L1B transmission method b, since time information is transmitted only by the L1 basic information that is robust, all time information can be protected sufficiently. Further, in the L1B transmission method b, since all time information is transmitted by the L1 basic information, it is possible to transmit all time information collectively together with the L1 basic information side. Consequently, for example, the reception apparatus 20 can decode the time information included in the L1 basic information more rapidly. Furthermore, according to the L1B transmission method b, time information can always be transmitted irrespective of the frame mode such as the time-aligned mode or the symbol-aligned mode.

It is to be noted that, while, in the L1 basic information of FIG. 14, an example is depicted in which time information in a unit of microsecond (L1B_time_usec) and time information in a unit of nanosecond (L1B_time_nsec) are included in the case of the symbol-aligned mode, only time information in a unit of microsecond (L1B_time_usec) may otherwise be included. Also in this case, time information of accuracy higher than a unit of millisecond is transmitted.

(3) L1D Transmission Method

Finally, the L1D transmission method is described with reference to the syntaxes of FIGS. 16 and 17.

(Syntax of L1 Basic Information)

FIG. 16 is a view depicting an example of the syntax of the L1 basic information of the L1D transmission method. However, in the syntax of FIG. 16, only characteristic portions are described with excerpts.

In the L1 basic information of FIG. 16, for L1B_time_info_flag, not 1 bit but 2 bits are secured. For example, it is assumed that, in the case where L1B_time_info_flag=01, time information in a unit of second and a unit of millisecond is placed. For example, in the case where L1B_time_info_flag=10, it is assumed that time information in a unit of microsecond is placed in addition to time information in a unit of second and a unit of millisecond. Further, for example, in the case where L1B_time_info_flag=11, time information in a unit of microsecond and a unit of nanosecond is placed in addition to time information in a unit of second and a unit of millisecond.

It is to be noted that, in the L1 basic information of FIG. 16, since time information is placed on the L1 detailed information side, time information is not placed there at all. Further, in the L1 basic information of FIG. 16, since L1B_time_info_flag has 2 bits, L1B_Reserved has 48 bits.

(Syntax of L1_Detailed Information)

FIG. 17 is a view depicting an example of the syntax of the L1 detailed information of the L1D transmission method. However, in the syntax of FIG. 17, only characteristic portions are described with excerpts.

In the L1 detailed information of FIG. 17, in the case where L1B_time_info_flag=01, time information in a unit of second (L1D_time_sec) and time information in a unit of millisecond (L1D_time_msec) are placed.

On the other hand, in the L1 detailed information of FIG. 17, in the case where L1B_time_info_flag=10, time information in a unit of microsecond (L1D_time_usec) is placed in addition to time information in a unit of second (L1D_time_sec) and time information in a unit of millisecond (L1D_time_msec).

Further, in the L1 detailed information of FIG. 17, in the case where L1B_time_info_flag=11, time information in a unit of microsecond (L1D_time_usec) and time information in a unit of nanosecond (L1D_time_nsec) are placed in addition to time information in a unit of second (L1D_time_sec) and time information in a unit of millisecond (L1D_time_msec).

In this manner, in the L1 detailed information of the L1D transmission method, time information in a unit of microsecond (L1D_time_usec) or time information in a unit of microsecond (L1D_time_usec) and time information in a unit of nanosecond (L1D_time_nsec) are included in addition to time information in a unit of second (L1D_time_sec) and time information in a unit of millisecond (L1D_time_msec) in response to the value of L1B_time_info_flag.

In this manner, in the case where the L1D transmission method is adopted, time information in a unit of second (L1D_time_sec), time information in a unit of millisecond (L1D_time_msec), time information in a unit of microsecond (L1D_time_usec) or time information in a unit of microsecond (L1D_time_usec) and time information in a unit of nanosecond (L1D_time_nsec) are transmitted only by the L1 detailed information. Further, since time obtained from the time information has accuracy of a unit of microsecond or a unit of nanosecond, in the case where the frame mode is the symbol-aligned mode, the error (jitters) from the time indicated by the time information can be suppressed even with a physical layer frame in which the frame length (frame time) is not units of integer milliseconds.

Further, in the L1D transmission method, since time information is transmitted only by the L1 detailed information, all time information can be protected with the same level. Further, in the L1D transmission method, since all time information is transmitted by the L1 detailed information, it is possible to transmit all time information collectively together with the L1 detailed information side. Therefore, for example, the reception apparatus 20 can easily analyze time information included in the L1 detailed information (time information configured simple).

It is to be noted that, while the L1 detailed information of FIG. 17 depicts an example in which three types of time information are placed in response to the value L1B_time_info_flag, only time information in a unit of second (L1D_time_sec), time information in a unit of millisecond (L1D_time_msec) and time information in a unit of microsecond (L1D_time_usec) may otherwise be placed. Also in this case, time information of accuracy higher than a unit of millisecond is transmitted.

Although the four transmission methods including the L1B+L1D transmission method, L1B transmission method a, L1B transmission method b and L1D transmission method are described above, particularly, for example, such time information as described subsequently is transmitted. In particular, since time information is represented by a binary coded decimal number (BCD: Binary Coded Decimal), for example, in the L1B+L1D transmission method, time information in a unit of millisecond (L1D_time_msec), time information in a unit of microsecond (L1B_time_usec) and time information in a unit of nanosecond (L1B_time_nsec) can be represented as "0.123456789 ns."

In this case, the time information in a unit of millisecond (L1D_time_msec) corresponds to "123" (=0x07c: 00_0111_1011b); the time information in a unit of microsecond (L1B_time_usec) corresponds to "456" (=0x1c8: 01_1100_1000b); and the time information in a unit of nanosecond (L1B_time_nsec) corresponds to "789" (=0x315:11_0001_0101b). In particular, in addition to transmission of the time information in a unit of millisecond (L1D_time_msec) that is "123," also the time information in a unit of microsecond (L1B_time_usec) of "456" and the time information in a unit of nanosecond (L1B_time_nsec) of "789" are transmitted as occasion demands. In other words, from within "0.123456789 nx" described above, the portion of "456789 ns" is the time information of the difference.

It is to be noted that the foregoing description is directed to a case in which, in the case where the frame mode is the symbol-aligned mode, on the assumption that a physical layer frame in which the frame length (frame time) is not units of integer milliseconds (physical layer frame having accuracy higher than a unit of millisecond) is transmitted, time information of accuracy higher than a unit of millisecond is transmitted as signaling (L1 basic information, L1 detailed information) Here, even in the case where not only a physical layer frame whose frame length has accuracy higher than a unit of integer milliseconds but also a physical layer frame whose frame length has accuracy of a unit of integer milliseconds is transmitted, time information of accuracy higher than a unit of millisecond may be transmitted as signaling.

In particular, in the case where the timing at which a physical layer frame is sent (started) is not in a unit of millisecond (in the case where the timing has accuracy higher than a unit of millisecond) and a physical layer frame whose frame length is units of integer milliseconds is transmitted, a physical layer frame whose frame time is not units of integer milliseconds. Therefore, in this case, by transmitting time information of accuracy higher than a unit of millisecond, it is possible to suppress the error (jitters) between the time indicated by the time information and the frame time.

Consequently, even in the case where the frame length of a physical layer frame is a unit of integer millisecond and besides the timing at which the physical layer frame is sent is not in a unit of millisecond, the physical layer frame can be transmitted freely, and therefore, it is possible to make mounting easier.

<4. Detailed Configuration of Transmission Apparatus and Reception Apparatus>

(Configuration Example of Transmission Apparatus and Reception Apparatus)

Figure 18:
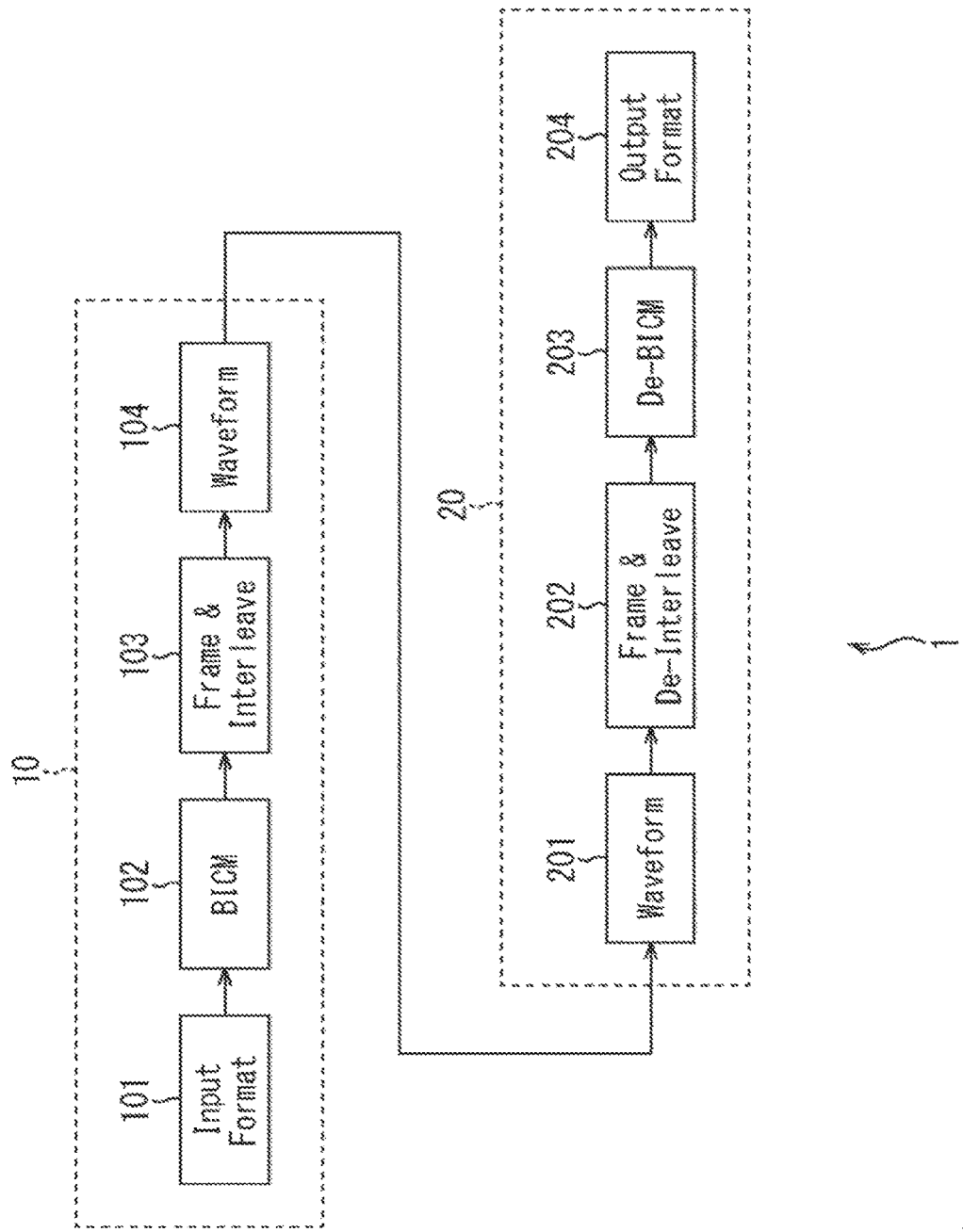
FIG. 18 is a view depicting an example of a configuration of a transmission apparatus on the transmission side and a reception apparatus on the reception side.

FIG. 18 is a view depicting an example of a configuration of the transmission apparatus 10 on the transmission side and the reception apparatus 20 on the reception side.

Referring to FIG. 18, the transmission apparatus 10 includes an input format processing section (Input Format) 101, a BICM (Bit Interleaved Coding and Modulation) processing section 102, a frame interleave processing section (Frame and Interleave) 103, and a waveform processing section (Waveform) 104.

The input format processing section 101 performs a necessary process for an input stream inputted thereto and performs a process for distributing a packet in which data obtained by the process is placed to a PLP (Physical Layer Pipe). The data processed by the input format processing section 101 is outputted to the BICM processing section 102.

The BICM processing section 102 performs an error correction process and such processes as bit interleave and orthogonal transform for the data inputted from the input format processing section 101. The data processed by the BICM processing section 102 is outputted to the frame interleave processing section 103.

The frame interleave processing section 103 performs such processes as interleave in a time direction or a frequency direction for the data inputted from the BICM processing section 102. The data processed by the frame interleave processing section 103 is outputted to the waveform processing section 104.

The waveform processing section 104 generates an OFDM (Orthogonal Frequency Division Multiplexing) signal on the basis of the data inputted from the frame interleave processing section 103 and transmits the OFDM signal through the transmission line 30. It is to be noted that a detailed configuration of the waveform processing section 104 is hereinafter described with reference to FIG. 19.

Meanwhile, in FIG. 18, the reception apparatus 20 includes a waveform processing section (Waveform) 201, a frame deinterleave processing section (Frame and De-Interleave) 202, a De-BICM processing section 203 and an output format processing section (Output Format) 204.

The waveform processing section 201 receives an OFDM signal transmitted from the transmission apparatus 10 through the transmission line 30 and performs a signal process for the OFDM signal. The data processed by the waveform processing section 201 is outputted to the frame deinterleave processing section 202. It is to be noted that a detailed configuration of the waveform processing section 201 is hereinafter described with reference to FIG. 21.

The frame deinterleave processing section 202 performs such a process as deinterleave in a frequency direction or a time direction for the data inputted from the waveform processing section 201. The data processed by the frame deinterleave processing section 202 is outputted to the De-BICM processing section 203.

The De-BICM processing section 203 performs such processes as orthogonal demodulation, bit deinterleave or an error correction process for the data inputted from the frame deinterleave processing section 202. The data processed by the De-BICM processing section 203 is outputted to the output format processing section 204.

The output format processing section 204 performs a necessary process for the data inputted from the De-BICM processing section 203 and outputs an output stream obtained by the process.

(Configuration Example of Waveform Processing Section of Transmission Side)

Figure 19:
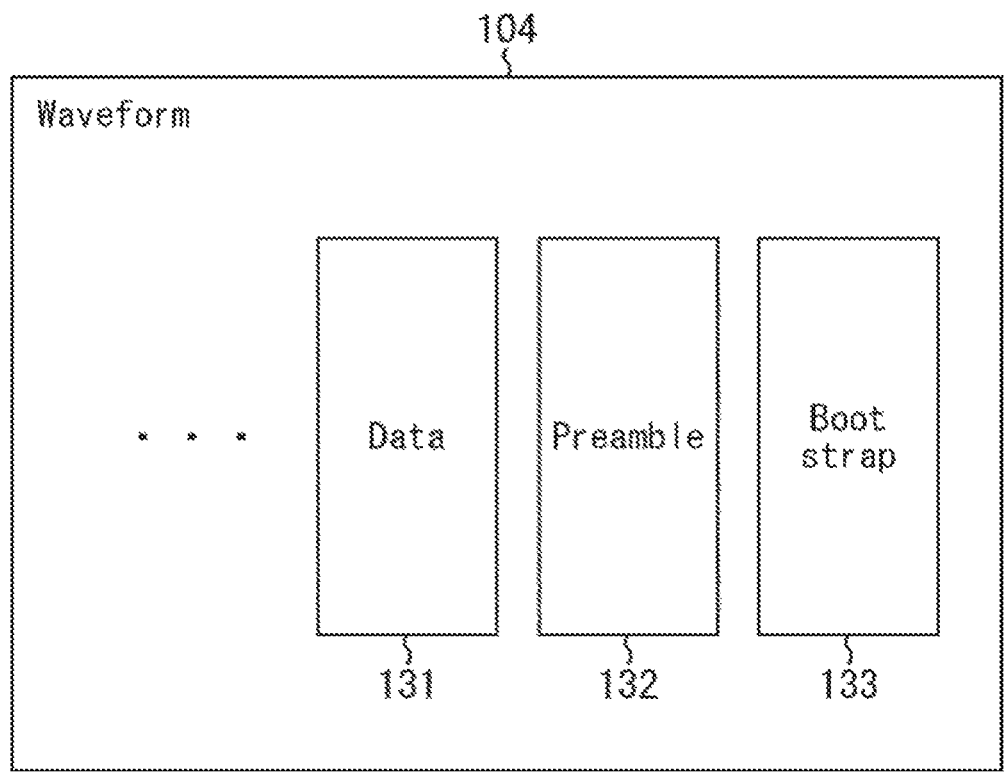
FIG. 19 is a view depicting an example of a configuration of a waveform processing section on the transmission side.

FIG. 19 is a view depicting an example of a configuration of the waveform processing section 104 of the transmission apparatus 10 of FIG. 18.

Referring to FIG. 19, the waveform processing section 104 includes a data processing section (Data) 131, a preamble processing section (Preamble) 132 and a bootstrap processing section (Bootstrap) 133.

The data processing section 131 performs a process relating to data included in the payload (Payload) of a physical layer frame.

The preamble processing section 132 performs a process relating to signaling included in the preamble (Preamble) of a physical layer frame. This signaling includes L1 basic information (L1-Basic) and L1 detailed information (L1-Detail).

Here, in the case where the L1B+L1D transmission method is adopted, the preamble processing section 132 generates L1 basic information (FIG. 10) including time information in a unit of microsecond and a unit of nanosecond (L1B_time_usec, L1B_time_nsec) and L1 detailed information (FIG. 11) including time information in a unit of second and a unit of millisecond (L1D_time_sec, L1D_time_msec) and places the generated information as signaling into a physical layer frame.

On the other hand, in the case where the L1B transmission method a or the L1B transmission method b is adopted, the preamble processing section 132 generates L1 basic information (FIG. 12 or 14) including time information in a unit of second, a unit of millisecond, a unit of microsecond and a unit of nanosecond (L1B_time_sec, L1B_time_msec, L1B_time_usec, L1B_time_nsec) and places the generated information as signaling into a physical layer frame. In this case, the L1 detailed information (FIG. 13 or 15) does not include time information.

Further, in the case where the L1D transmission method is adopted, the preamble processing section 132 generates L1 detailed information (FIG. 17) including time information in a unit of second, a unit of millisecond, a unit of microsecond and a unit of nanosecond (L1D_time_sec, L1D_time_msec, L1D_time_usec, L1D_time_nsec) and places the generated information as signaling into a physical layer frame. However, in this case, the L1 basic information (FIG. 16) does not include time information.

The bootstrap processing section 133 performs a process relating to data or signaling included in the bootstrap (bootstrap) of a physical layer frame.

It is to be noted that, though not depicted in FIG. 19, in the waveform processing section 104, a processing section is provided which performs a process for inserting a symbol of a pilot (PILOTS), a process relating to MISO, a process relating to IFFT (Inverse Fast Fourier Transform), a process relating to PAPR and a process relating to the guard interval, and those processes are performed.

(Transmission Side Data Process)

Figure 20:
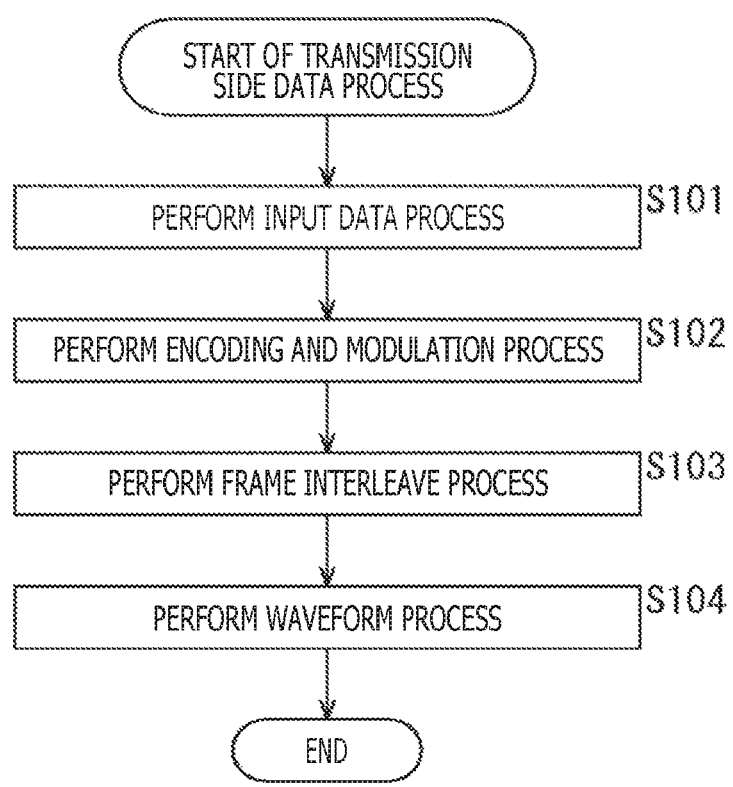
FIG. 20 is a flow chart illustrating a flow of a data process on the transmission side.

Now, a flow of a transmission side data process executed by the transmission apparatus 10 of FIG. 18 is described with reference to a flow chart of FIG. 20.

At step S101, the input format processing section 101 performs an input data process. In the input data process, a necessary process is performed for the inputted input stream, and a packet in which data obtained by the process is placed is distributed to one or a plurality of PLPs.

At step S102, the BICM processing section 102 performs an encoding and modulation process. In this encoding and modulation process, an error correction process, such processes as bit interleave or orthogonal modulation and so forth are performed.

At step S103, the frame interleave processing section 103 performs a frame interleave process. In this frame interleave processes, such a process as interleave in a time direction or a frequency direction is performed.

At step S104, the waveform processing section 104 performs a waveform process. In this waveform process, an OFDM signal is generated and transmitted through the transmission line 30. Further, data or signaling is processed by the data processing section 131, preamble processing section 132 and bootstrap processing section 133.

Here, in the case where the L1B+L1D transmission method is adopted, the preamble processing section 132 generates L1 basic information (FIG. 10) including time information in a unit of microsecond and information in a unit of nanosecond (L1B_time_usec, L1B_time_nsec) and L1 detailed information (FIG. 11) including time information in a unit of second and a unit of millisecond (L1D_time_sec, L1D_time_msec) and places the generated information into the preamble of a physical layer frame.

On the other hand, in the case where the L1B transmission method a or the L1B transmission method b is adopted, the preamble processing section 132 generates L1 basic information (FIG. 12 or 14) including time information in a unit of second, a unit of millisecond, a unit of microsecond and a unit of nanosecond (L1B_time_sec, L1B_time_msec, L1B_time_usec, L1B_time_nsec) and places the generated information into the preamble of a physical layer frame.

Further, in the case where the L1D transmission method is adopted, the preamble processing section 132 generates L1 detailed information (FIG. 17) including time information in a unit of second, a unit of millisecond, a unit of microsecond and a unit of nanosecond (L1D_time_sec, L1D_time_msec, L1D_time_usec, L1D_time_nsec) and places the generated information into the preamble of a physical layer frame.

A flow of the transmission side data process has been described. In this transmission side data process, by adopting the L1B+L1D transmission method, the L1B transmission method a, the L1B transmission method b, or the L1D transmission method, signaling is generated in which time information in a unit of second, time information in a unit of millisecond, time information in a unit of microsecond and time information in a unit of nanosecond are included in information of at least one of the L1 basic information and the L1 detailed information, and the signaling is placed into the preamble of a physical layer frame.

Then, since the time obtained from the time information has accuracy higher than the accuracy of a unit of millisecond (accuracy of a unit of microsecond or accuracy of a unit of nanosecond), in the case where the frame mode is the symbol-aligned mode, when the frame mode is the symbol-aligned mode, the error (jitters) from the time indicated by the time information can be suppressed even with a physical layer frame in which the frame length (frame time) is not units of integer milliseconds.

Therefore, errors of time arising from the accuracy of time information transmitted by signaling can be reduced. Furthermore, it is possible to place and transmit time information into and together with signaling without consciousness of whether or not the frame length of the physical layer frame (frame time) is units of integer milliseconds (for example, without consciousness of a frame number of a physical layer frame or the like).

Further, if time information of a unit of microsecond of 10 bits and time information of a unit of nanosecond of 10 bits are added to the signaling, then accuracy of a level similar to that of the PTP can be implemented. Alternatively, if only time information of a unit of microsecond of 10 bits is added, then accuracy that is equal to or higher than that of a system in the present circumstances and is sufficient can be implemented. It is to be noted that, in the latter case, since time information of a unit of microsecond of 10 bits is transmitted additionally, information for 10 bits is reduced in comparison with that in an alternative case in which both time information of the former is transmitted additionally, and the transmission efficiency can be improved.

Further, since sufficient accuracy of signaling can be implemented only by adding time information of a unit of microsecond or a unit of nanosecond, as the transmission side data process, there is no necessity to perform a complicated process in comparison with existing processes (it is easy to treat data). Further, since the information to be added to the signaling is time information itself, it does not have a dependence relation with any other parameter included in the signaling, and, for example, even if expansion of standards is performed in the future, there is little possibility that the information may be influenced by the expansion of standards.

(Configuration Example of Waveform Processing Section of Reception Side)

Figure 21:
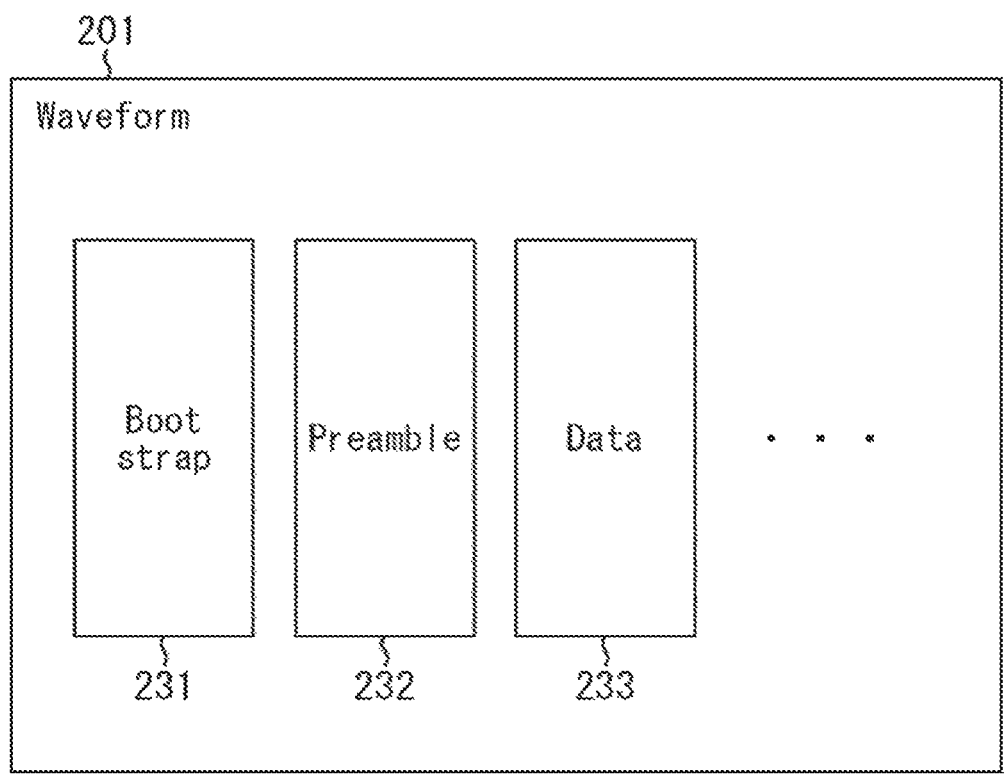
FIG. 21 is a view depicting an example of a configuration of a waveform processing section on the reception side.

FIG. 21 is a view depicting a configuration example of the waveform processing section 201 of the reception apparatus 20 of FIG. 18.

Referring to FIG. 21, the waveform processing section 201 includes a bootstrap processing section (Bootstrap) 231, a preamble processing section (Preamble) 232 and a data processing section (Data) 233.

The bootstrap processing section 231 performs a process relating to data or signaling included in the bootstrap (Bootstrap) of a physical layer frame.

The preamble processing section 232 performs a process relating to the signaling included in the preamble (Preamble) of the physical layer frame. This signaling includes L1 basic information (L1-Basic) and L1 detailed information (L1-Detail).

Here, in the case where the L1B+L1D transmission method is adopted, since L1 basic information (FIG. 10) including time information of a unit of microsecond and a unit of nanosecond (L1B_time_usec, L1B_time_nsec) and L1 detailed information (FIG. 11) including time information of a unit of second and a unit of millisecond (L1D_time_sec, L1D_time_msec) are included as the signaling in the preamble of the physical layer frame, the preamble processing section 232 process the time information of them.

On the other hand, in the case where the L1B transmission method a or the L1B transmission method b is adopted, since L1 basic information (FIG. 12 or 14) including time information of a unit of second, a unit of millisecond, a unit of microsecond and a unit of nanosecond (L1B_time_sec, L1B_time_msec, L1B_time_usec, L1B_time_nsec) is included as the signaling in the preamble of the physical layer frame, the preamble processing section 232 processes the time information of them. However, in this case, the L1 detailed information (FIG. 13 or 15) does not include time information.

Further, in the case where the L1D transmission method is adopted, since L1 detailed information (FIG. 17) including time information of a unit of second, a unit of millisecond, a unit of microsecond and a unit of nanosecond (L1D_time_sec, L1D_time_msec, L1D_time_usec, L1D_time_nsec) is included as the signaling in the preamble of the physical layer frame, the preamble processing section 232 processes the time information of them. However, in this case, the L1 basic information (FIG. 16) does not include time information.

The data processing section 233 performs a process relating to data included in the payload (Payload) of the physical layer frame.

It is to be noted that, though not depicted in FIG. 21, in the waveform processing section 201, a processing section is provided which performs a process relating to a guard interval, a process relating to the PAPR, a process relating to FFT (Fast Fourier Transform), a process relating to the MISO and a process relating to a symbol of a pilot, and the processes are performed.

(Reception Side Data Process)

Figure 22:
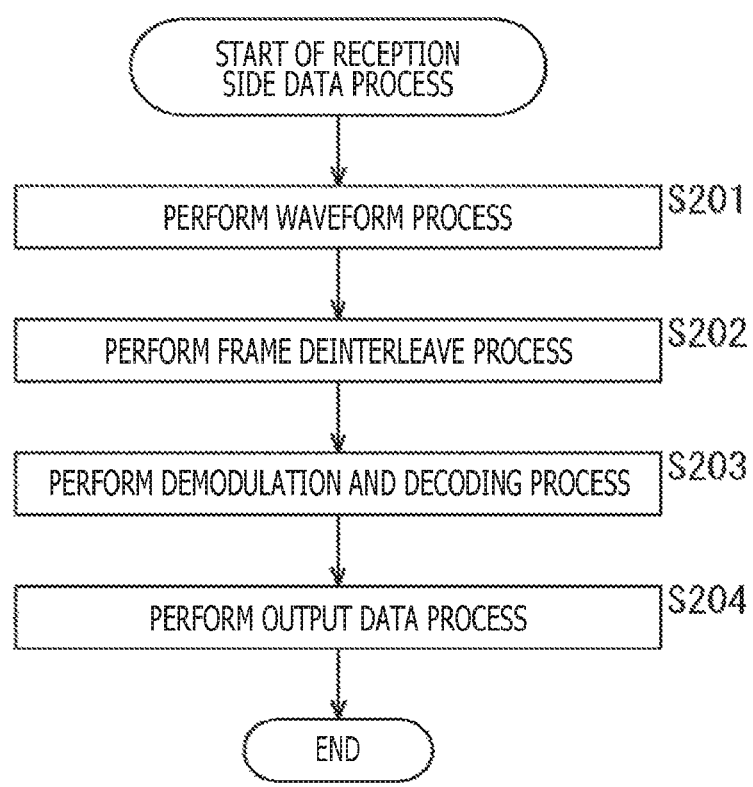
FIG. 22 is a flow chart illustrating a flow of a data process on the reception side.

Now, a flow of the reception data process executed by the reception apparatus 20 of FIG. 18 is described with reference to a flow chart of FIG. 22.

At step S201, the waveform processing section 201 performs a waveform process. In this waveform process, an OFDM signal transmitted from the transmission apparatus 10 (FIG. 18) though the transmission line 30 is received, and a signal process for the OFDM signal is performed. Further, data and signaling are processed by the bootstrap processing section 231, preamble processing section 232 and data processing section 233.

Here, in the case where the L1B+L1D transmission method is adopted, since L1 basic information (FIG. 10) including time information of a unit of microsecond and a unit of nanosecond (L1B_time_usec, L1B_time_nsec) and L1 detailed information (FIG. 11) including time information of a unit of second and a unit of millisecond (L1D_time_sec, L1D_time_msec) are included as the signaling in the preamble of the physical layer frame, the preamble processing section 232 processes the time information.

On the other hand, in the case where the L1B transmission method a or the L1B transmission method b is adopted, since L1 basic information (FIG. 12 or 14) including time information of a unit of second, a unit of millisecond, a unit of microsecond and a unit of nanosecond (L1B_time_sec, L1B_time_msec, L1B_time_usec, L1B_time_nsec) is included as the signaling in the preamble of the physical layer frame, the preamble processing section 232 processes the time information.

Further, in the case where the L1D transmission method is adopted, since L1 detailed information (FIG. 17) of time information of a unit of second, a unit of millisecond, a unit of microsecond and a unit of nanosecond (L1D_time_sec, L1D_time_msec, L1D_time_usec, L1D_time_nsec) is included as the signaling in the preamble of the physical layer frame, the preamble processing section 232 processes the time information.

At step S202, the frame deinterleave processing section 202 performs a frame deinterleave process. In this frame deinterleave process, such processes as deinterleave in a frequency direction or a time direction are performed.

At step S203, the De-BICM processing section 203 performs a demodulation and decoding process. In this demodulation and decoding process, such processes as orthogonal demodulation, bit deinterleave and an error correction process are performed.

At step S204, the output format processing section 204 performs an output data process. In this output data process, a necessary process is performed for inputted data, and resulting data is outputted as an output stream.

A flow of the reception side data process is described above. In this reception side data process, by adopting the L1B+L1D transmission method, L1B transmission method a, L1B transmission method b or L1D transmission method, signaling in which time information of a unit of second, time information of a unit of millisecond, time information of a unit of microsecond and time information of a unit of nanosecond are included in information of at least one of the L1 basic information and the L1 detailed information is acquired from the preamble of the physical layer frame and is processed.

Then, since the time obtained from the time information has accuracy higher than the accuracy of a unit of millisecond (accuracy of a unit of microsecond or accuracy of a unit of nanosecond), in the case where the frame mode is the symbol-aligned mode, when the frame mode is the symbol-aligned mode, the error (jitters) from the time indicated by the time information can be suppressed even with a physical layer frame in which the frame length (frame time) is not units of integer milliseconds.

Therefore, errors of time arising from the accuracy of time information transmitted by signaling can be reduced. Furthermore, it is possible to process time information included in the signaling without consciousness of whether or not the frame length of the physical layer frame (frame time) is units of integer milliseconds (for example, without consciousness of a frame number of a physical layer frame or the like).

Further, if time information of a unit of microsecond of 10 bits and time information of a unit of nanosecond of 10 bits are added to the signaling, then accuracy of a level similar to that of the PTP can be implemented. Alternatively, if only time information of a unit of microsecond of 10 bits is added, then accuracy that is equal to or higher than that of a system in the present circumstances and is sufficient can be implemented. It is to be noted that, in the latter case, since time information of a unit of microsecond of 10 bits is transmitted additionally, information for 10 bits is reduced in comparison with that in an alternative case in which both time information of the former is transmitted additionally, and the transmission efficiency can be improved.

Further, since sufficient accuracy of signaling can be implemented only by adding time information of a unit of microsecond or a unit of nanosecond, as the transmission side data process, there is no necessity to perform a complicated process in comparison with existing processes (it is easy to treat data). Further, since the information to be added to the signaling is time information itself, it does not have a dependence relation with any other parameter included in the signaling, and, for example, even if expansion of standards is performed in the future, there is little possibility that the information may be influenced by the expansion of standards.

<5. Modifications>

While, in the foregoing description, ATSC (especially, ATSC3.0) that is a method adopted in the United States and so forth is described as a standard for digital broadcasting, the present technology may be applied also to ISDB (Integrated Services Digital Broadcasting) that is a method adopted in Japan and so forth, DVB (Digital Video Broadcasting) that is a method adopted in European countries and so forth or the like. Further, while the foregoing description is given taking ATSC3.0 adopted by the IP transmission method as an example, the present technology may be applied not only to the IP transmission method but also to other methods such as, for example, MPEG2-TS (Transport Stream) method.

Further, in regard to digital broadcasting, the present technology can be applied not only to terrestrial broadcasting but also to satellite broadcasting that utilizes a broadcasting satellite (BS: Broadcasting Satellite), a communication satellite (CS: Communication Satellite) or the like, cable broadcasting such as cable television (CATV) or the like and so forth.

Further, while, in the foregoing description, the time information is described taking information of time prescribed by the PTP (Precise Time Protocol) as an example, the time information is not limited to the PTP, but arbitrary information of time such as, for example, information of time prescribed by the NTP (Network Time Protocol), information of time prescribed by the 3GPP (Third Generation Partnership Project), information of time included in GPS (Global Positioning System) information or information of time of other forms determined uniquely can be adopted.

Furthermore, the present technology can be applied also to predetermined standards (standards other than standards for digital broadcasting) prescribed on the assumption that, as the transmission line, a transmission line other than a broadcasting network, namely, a communication line (communication network) such as the Internet or a telephone network or the like is utilized. In this case, as the transmission line 30 of the transmission system 1 (FIG. 1), a communication line such as the Internet or a telephone network is utilized, and the transmission apparatus 10 can be a server provided on the Internet. Further, by configuring the reception apparatus 20 so as to have a communication function, the transmission apparatus 10 (server) performs a process in accordance with a request from the reception apparatus 20. Further, the reception apparatus 20 processes data transmitted thereto from the transmission apparatus 10 (sever) through the transmission line 30 (communication line).

Further, the designation such as signaling described hereinabove is an example, and some other designation is sometimes used. However, the difference in designation is a formal difference and is not different in substantial contents of the signaling of the target.

<6. Configuration of Computer>

Figure 23:
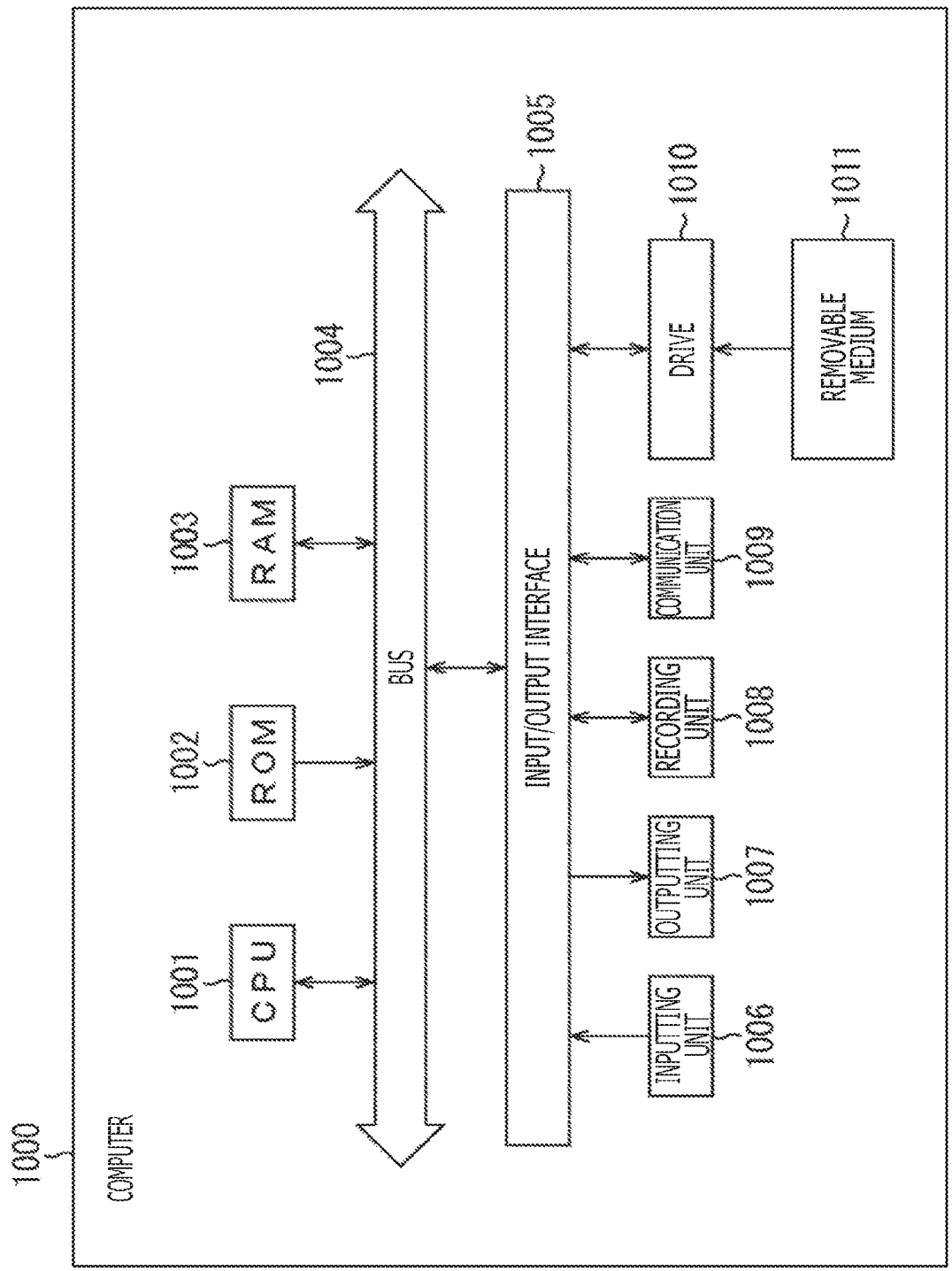
FIG. 23 is a view depicting an example of a configuration of a computer.

While the series of processes described hereinabove can be executed by hardware, it can otherwise be executed by software. In the case where the series of processes is executed by software, a program that constructs the software is installed into a computer. FIG. 23 is a view depicting an example of a hardware configuration of a computer that executes the series of processes described hereinabove by a program.

In the computer 1000, a CPU (Central Processing Unit) 1001, a ROM (Read Only Memory) 1002 and a RAM (Random Access Memory) 1003 are connected to each other by a bus 1004. To the bus 1004, an input/output interface 1005 is connected further. To the input/output interface 1005, an inputting section 1006, an outputting section 1007, a recording section 1008, a communication section 1009 and a drive 1010 are connected.

The inputting section 1006 is configured, for example, from a keyboard, a mouse, a microphone and so forth. The outputting section 1007 is configured, for example, from a display, a speaker and so forth. The recording section 1008 includes a hard disk, a nonvolatile memory or the like. The communication section 1009 includes, for example, a network interface. The drive 1010 drives a removable medium 1011 such as a magnetic disk, an optical disk, a magneto-optical disk or a semiconductor memory.

In the computer 1000 configured in such a manner as described above, the CPU 1001 loads a program recorded, for example, in the ROM 1002 or the recording section 1008 into the RAM 1003 through the input/output interface 1005 and the bus 1004 and executes the program to perform the series of processes described hereinabove.

The program to be executed by the computer 1000 (CPU 1001) can be recorded into and provided, for example, as a removable medium 1011 as a package medium. Further, the program can be provided through a wired or wireless transmission medium such as a local area network, the Internet or a digital satellite broadcast.

In the computer 1000, the program can be installed into the recording section 1008 through the input/output interface 1005 by loading a removable medium 1011 into the drive 1010. Further, the program can be received through a wired or wireless transmission medium by the communication section 1009 and installed into the recording section 1008. Alternatively, the program can be installed into the ROM 1002 or the recording section 1008 in advance.

Here, in the present specification, the processes that are performed in accordance with the program by the computer need not necessarily be performed in a time series in accordance with the order described as a flow chart. In other words, the processes performed in accordance with the program by the computer include also processes that are executed in parallel or individually (for example, parallel processes or processes by an object). Further, the program may be processed by one computer (processor) or may be processed in a distributed manner by a plurality of computers.

It is to be noted that the embodiment of the present technology is not limited the embodiment described hereinabove but can be altered in various manners without departing from the subject matter of the present technology.

Further, the present technology can take also the following configuration.

(1)

A data processing apparatus, including:

a generation section configured to generate signaling including time information having accuracy of time according to a frame length of a physical layer frame; and a processing section configured to process the signaling so as to be included into a preamble of the physical layer frame.

(2)

The data processing apparatus according to (1), in which
the signaling includes first information and second information that is read out after the first information, and
the time information is included in at least one of the first information and the second information.

(3)

The data processing apparatus according to (2), in which
the frame length of the physical layer frame has accuracy higher than a unit of millisecond, and
the time information has accuracy higher than a unit of millisecond.

(4)

The data processing apparatus according to (3), in which
the second information includes time information of a unit of second and time information of a unit of millisecond, and
the first information includes at least one of time information of a unit of microsecond, and time information of a unit of microsecond and time information of a unit of nanosecond.

(5)

The data processing apparatus according to (3), in which
the first information includes time information of a unit of second, time information of a unit of millisecond, and time information of a unit of microsecond or time information of a unit of microsecond and time information of a unit of nanosecond.

(6)

The data processing apparatus according to (3), in which
the second information includes time information of a unit of second, time information of a unit of millisecond, and time information of a unit of microsecond or time information of a unit of microsecond and time information of a unit of nanosecond.

(7)

The data processing apparatus according to (2), in which
the frame length of the physical layer frame has accuracy of a unit of millisecond, and
the time information has accuracy higher than a unit of millisecond.

(8)

The data processing apparatus according to any one of (2) to (7), in which
the physical layer frame is a physical layer frame prescribed by ATSC (Advanced Television Systems Committee) 3.0,
the first information is L1 basic information (L1-Basic) included in the preamble prescribed by ATSC3.0, and
the second information is L1 detailed information (L1-Detail) included in the preamble prescribed by ATSC3.0.

(9)

The data processing apparatus according to any one of (3) to (8), in which
a first mode in which the frame length of the physical layer frame is adjusted to units of millisecond and a second mode in which the frame length of the physical layer frame is not adjusted, and
in the case where the second mode is set, the time information has accuracy higher than a unit of millisecond.

(10)

A data processing method of a data processing apparatus, including the steps by the data processing apparatus of:

generating signaling including time information having accuracy of time according to a frame length of a physical layer frame; and processing the signaling so as to be included into a preamble of the physical layer frame.

(11)
A data processing apparatus, including:
a processing section configured to process signaling included in a preamble of a physical layer frame and including time information having accuracy of time according to a frame length of the physical layer frame.

(12)
The data processing apparatus according to (11), in which the signaling includes first information and second information that is read out after the first information, and
the time information is included in at least one of the first information and the second information.

(13)
The data processing apparatus according to (12), in which the frame length of the physical layer frame has accuracy higher than a unit of millisecond, and
the time information has accuracy higher than a unit of millisecond.

(14)
The data processing apparatus according to (13), in which the second information includes time information of a unit of second and time information of a unit of millisecond, and
the first information includes at least one of time information of a unit of microsecond, and time information of a unit of microsecond and time information of a unit of nanosecond.

(15)
The data processing apparatus according to (13), in which the first information includes time information of a unit of second, time information of a unit of millisecond, and time information of a unit of microsecond or time information of a unit of microsecond and time information of a unit of nanosecond.

(16)
The data processing apparatus according to (13), in which the second information includes time information of a unit of second, time information of a unit of millisecond, and time information of a unit of microsecond or time information of a unit of microsecond and time information of a unit of nanosecond.

(17)
The data processing apparatus according to (12), in which the frame length of the physical layer frame has accuracy of a unit of millisecond, and
the time information has accuracy higher than a unit of millisecond.

(18)
The data processing apparatus according to any one of (12) to (17), in which
the physical layer frame is a physical layer frame prescribed by ATSC (Advanced Television Systems Committee) 3.0,
the first information is L1 basic information (L1-Basic) included in the preamble prescribed by ATSC3.0, and
the second information is L1 detailed information (L1-Detail) included in the preamble prescribed by ATSC3.0.

(19)
The data processing apparatus according to any one of (13) to (18), in which
a first mode in which the frame length of the physical layer frame is adjusted to units of millisecond and a second mode in which the frame length of the physical layer frame is not adjusted, and
in the case where the second mode is set, the time information has accuracy higher than a unit of millisecond.

(20)
A data processing method of a data processing apparatus, including the step by the data processing apparatus of:
processing signaling included in a preamble of a physical layer frame and including time information having accuracy of time according to a frame length of the physical layer frame.

REFERENCE SIGNS LIST

1 Transmission system, 10 Transmission apparatus, 20 Reception apparatus, 30 Transmission line, 101 Input format processing section, 102 BICM processing section, 103 Frame interleave processing section, 104 Waveform processing section, 131 Data processing section, 132 Preamble processing section, 133 Bootstrap processing section, 201 Waveform processing section, 202 Frame deinterleave processing section, 203 De-BICM processing section, 204 Output format processing section, 231 Bootstrap processing section, 232 Preamble processing section, 233 Data processing section, 1000 Computer, 1001 CPU

The invention claimed is:

1. A data transmission apparatus, comprising:
circuitry configured to:
generate a physical layer frame having a length of time;
generate signaling data including a time information flag indicating presence or absence of time information in the signaling data and, in a case when the time information is present in the signaling data, the time information flag indicating which of more than one of a plurality of fields of different precisions of time are present in the time information in the signaling data; and
insert the signaling data into a preamble of the physical layer frame.

2. The data transmission apparatus according to claim 1, wherein
the signaling data includes first information and second information that is read out after the first information, and
the time information is included in at least one of the first information and the second information.

3. The data transmission apparatus according to claim 1, wherein
the plurality of fields of different precisions includes a first precision in which the time information includes a first portion in units of seconds and a second portion in units of milliseconds.

4. The data transmission apparatus according to claim 3, wherein the plurality of fields of different precisions includes a second precision in which the time information includes a portion in units of microseconds.

5. The data transmission apparatus according to claim 4, wherein the plurality of fields of different precisions includes a third precision in which the time information includes a portion in units of nanoseconds.

6. The data transmission apparatus according to claim 2, wherein
the physical layer frame is a physical layer frame prescribed by ATSC (Advanced Television Systems Committee) 3.0,
the first information is L1 basic information (L1-Basic) included in a preamble prescribed by ATSC3.0, and
the second information is L1 detailed information (L1-Detail) included in the preamble prescribed by ATSC3.0.

7. The data transmission apparatus according to claim 3, wherein the circuitry is configured to set a mode in which the length of time of the physical layer frame is not adjusted to an integer millisecond length.

8. A method of a data transmission apparatus, comprising:
generating a physical layer frame having a length of time;
generating signaling data including a time information flag indicating presence or absence of time information in the signaling data and, in a case when the time information is present in the signaling data, the time information flag indicating which of more than one of a plurality of fields of different precisions of time are present in the time information in the signaling data; and
inserting the signaling data into a preamble of the physical layer frame.

9. A data reception apparatus, comprising:
circuitry configured to:
receive a physical layer frame having a length of time; and
process signaling data included in a preamble of the physical layer frame and including a time information flag indicating presence or absence of time information in the signaling data and, in a case when the time information is present in the signaling data, the time information flag indicating which of more than one of a plurality of fields of different precisions of time are present in the time information in the signaling data.

10. The data reception apparatus according to claim 9, wherein
the signaling data includes first information and second information that is read out after the first information, and
the time information is included in at least one of the first information and the second information.

11. The data reception apparatus according to claim 9, wherein the plurality of fields of different precisions includes a first precision in which the time information includes a first portion in units of seconds and a second portion in units of milliseconds.

12. The data reception apparatus according to claim 11, wherein the plurality of fields of different precisions includes a second precision in which the time information includes a third portion in units of microseconds.

13. The data reception apparatus according to claim 12, wherein the plurality of fields of different precisions includes a third precision in which the time information includes a fourth portion in units of nanoseconds.

14. The data reception apparatus according to claim 10, wherein
the physical layer frame is a physical layer frame prescribed by ATSC (Advanced Television Systems Committee) 3.0,
the first information is L1 basic information (L1-Basic) included in a preamble prescribed by ATSC3.0, and
the second information is L1 detailed information (L1-Detail) included in the preamble prescribed by ATSC3.0.

15. The data reception apparatus according to claim 11, wherein the circuitry is configured to set a mode in which the length of time of the physical layer frame is not adjusted to an integer millisecond length.

16. A method of a data reception apparatus, comprising:
receiving a physical layer frame having a length of time; and
processing signaling data included in a preamble of the physical layer frame and including a time information flag indicating presence or absence of time information in the signaling data and, in a case when the time information is present in the signaling data, the time information flag indicating which of more than one of a plurality of fields of different precisions of time are present in the time information in the signaling data.

17. The method according to claim 8, wherein
the signaling data includes first information and second information that is read out after the first information, and
the time information is included in at least one of the first information and the second information.

18. The method according to claim 8, wherein the plurality of fields of different precisions includes:
a first precision in which the time information includes a first portion in units of seconds and a second portion in units of milliseconds,
a second precision in which the time information includes a third portion in units of microseconds, and
a third precision in which the time information includes a fourth portion in units of nanoseconds.

19. The method according to claim 16, wherein
the signaling data includes first information and second information that is read out after the first information, and
the time information is included in at least one of the first information and the second information.

20. The method according to claim 16, wherein the plurality of fields of different precisions includes:
a first precision in which the time information includes a first portion in units of seconds and a second portion in units of milliseconds,
a second precision in which the time information includes a third portion in units of microseconds, and
a third precision in which the time information includes a fourth portion in units of nanoseconds.

21. The data transmission apparatus according to claim 1, wherein the time information represents a time of a predetermined position in the physical layer frame.

22. The method according to claim 8, wherein the time information represents a time of a predetermined position in the physical layer frame.

23. The data reception apparatus according to claim 9, wherein the time information represents a time of a predetermined position in the physical layer frame.

24. The method according to claim 16, wherein the time information represents a time of a predetermined position in the physical layer frame.

* * * * *